(12) United States Patent
Cho

(10) Patent No.: US 9,104,255 B2
(45) Date of Patent: Aug. 11, 2015

(54) MOBILE DEVICE USING E-PAPER DISPLAY PANEL AND METHOD FOR CONTROLLING THE SAME

(71) Applicant: LG ELECTRONICS INC., Seoul (KR)

(72) Inventor: Eunhyung Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 79 days.

(21) Appl. No.: 13/896,042

(22) Filed: May 16, 2013

(65) Prior Publication Data

US 2014/0292670 A1 Oct. 2, 2014

(30) Foreign Application Priority Data

Mar. 29, 2013 (KR) ........................ 10-2013-0034103

(51) Int. Cl.
*G06F 3/041* (2006.01)
(52) U.S. Cl.
CPC ...................................... *G06F 3/041* (2013.01)
(58) Field of Classification Search
USPC ................... 345/173, 633, 174; 455/574, 411
See application file for complete search history.

(56) References Cited

U.S. PATENT DOCUMENTS

2009/0280872 A1 11/2009 Kajiya et al.
2010/0253671 A1 10/2010 Perry et al.
2011/0256848 A1 10/2011 Bok et al.
2011/0304648 A1* 12/2011 Kim et al. ..................... 345/633
2012/0284789 A1 11/2012 Kim et al.
2013/0189952 A1* 7/2013 Kim ............................... 455/411
2014/0144984 A1* 5/2014 Olson et al. ................... 235/380
2014/0210754 A1* 7/2014 Ryu et al. ....................... 345/173

FOREIGN PATENT DOCUMENTS

EP 2 330 490 A2 6/2011
WO WO 2012/177391 A2 12/2012

* cited by examiner

*Primary Examiner* — Thuy Pardo
(74) *Attorney, Agent, or Firm* — Birch, Stewart, Kolasch & Birch, LLP

(57) ABSTRACT

A mobile device using an e-paper display panel and a method for controlling the same are disclosed, in which the mobile device is switched to a standby mode and a lock mode. The mobile device includes an e-paper display unit configured to display contents; an input signal receiving unit configured to detect an input signal and transmit the detected input signal to a processor; and the processor configured to control the e-paper display unit and the input signal receiving unit, wherein the processor is further configured to switch the mobile device to a first standby mode if a lack of a touch input signal is detected for a predetermined time, wherein the first standby mode is a mode displaying a first image on the e-paper display unit and disabling detecting of a touch input signal for the displayed first image.

18 Claims, 17 Drawing Sheets

MOBILE DEVICE USING E-PAPER DISPLAY PANEL AND METHOD FOR CONTROLLING THE SAME

This application claims the benefit of the Korean Patent Application No. 10-2013-0034103, filed on Mar. 29, 2013, which is hereby incorporated by reference as if fully set forth herein.

BACKGROUND OF THE INVENTION

1. Field of the Invention

The present specification relates to a mobile device using an e-paper display panel and a method for controlling the same, and more particularly, to a method for switching a mobile device, which uses an e-paper display panel, to a standby mode and a lock mode.

2. Discussion of the Related Art

LCD, LED, etc. have been used as a display unit of a mobile terminal. Recently, a mobile terminal that uses e-paper as a display means has appeared. LCD and LED display images in such a manner that an element emits light to a panel per pixel, whereas e-paper displays desired images in such a manner that a capsule containing color ink is distributed on a panel and then an electric signal is sent to the panel to allow a specific color to come up. Since the e-paper allows a user to view images by using an electronic ink instead of a liquid crystal through an external lighting only even without light emitted behind a screen unlike the other displays, it has low power consumption. Also, a displayed screen of the LCD disappears immediately if the power of LCD is turned off, whereas a screen of the e-paper is maintained as it is even the power is turned off. Also, since the e-paper has a viewing angle wider than that of a liquid crystal display, the user may easily read characters at various angles.

Furthermore, the demand of the e-paper has been recently increased in various fields. For example, the e-paper has been used in various fields such as subway advertisements, e-apparel, and smart phones.

SUMMARY OF THE INVENTION

Accordingly, the present specification is directed to a mobile device using an e-paper display panel and a method for controlling the same, which substantially obviate one or more problems due to limitations and disadvantages of the related art.

An object of the present specification is to provide a mobile device using an e-paper display panel and a method for controlling the same, in which the mobile device continues to display contents on an e-paper display unit when it is switched to a standby mode and a lock mode.

Another object of the present specification is to provide a mobile device using an e-paper display panel and a method for controlling the same, in which a standby mode of the mobile device is divided into three modes by using properties of e-paper.

Still another object of the present specification is to provide a mobile device using an e-paper display panel and a method for controlling the same, in which the mobile device is to diversify a standby mode switched in accordance with the presence of an input signal and types of the input signal.

Further still another object of the present specification is to provide a mobile device using an e-paper display panel and a method for controlling the same, in which a touch off indicator is displayed in a standby mode of the mobile device to indicate that detecting of a touch input signal has been disabled in the standby mode.

Further still another object of the present specification is to provide a mobile device using an e-paper display panel and a method for controlling the same, in which contents displayed in a lock mode of an additional display unit of the mobile device are determined on the basis of a standby mode of an e-paper display unit.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the specification, as embodied and broadly described herein, a mobile device comprises an e-paper display unit configured to display contents; an input signal receiving unit configured to detect an input signal and transmit the detected input signal to a processor; and the processor configured to control the e-paper display unit and the input signal receiving unit, wherein the processor is further configured to switch the mobile device to a first standby mode if a lack of a touch input signal is detected for a predetermined time, wherein the first standby mode is a mode displaying a first image on the e-paper display unit and disabling detecting of a touch input signal for the displayed first image, switch the mobile device to a second standby mode if a first standby switching signal is detected within the predetermined time, wherein the second standby mode is a mode displaying a second image on the e-paper display unit and disabling detecting of a touch input signal for the displayed second image, switch the mobile device to a first lock mode if a standby release signal is detected in the first standby mode, wherein the first lock mode is a mode displaying an unlock interface on the first image, and switch the mobile device to a second lock mode if the standby release signal is detected in the second standby mode, wherein the second lock mode is a mode displaying the unlock interface on the second image.

In another aspect of the present invention, a mobile device comprises an e-paper display unit configured to display contents; an input signal receiving unit configured to detect an input signal and transmit the detected input signal to a processor; and the processor configured to control the e-paper display unit and the input signal reception unit, wherein the processor is further configured to switch the mobile device to a first standby mode if a lack of a touch input signal is detected for a predetermined time, wherein the first standby mode is a mode displaying a first image on the e-paper display unit and disabling detecting of a touch input signal for the displayed first image, switch the mobile device to a second standby mode if a first standby switching signal is detected within the predetermined time, wherein the second standby mode is a mode displaying a second image on the e-paper display unit and disabling detecting of a touch input signal for the displayed second image, and switch the mobile device to a third standby mode if a second standby switching signal is detected within the predetermined time, wherein the third standby mode is a mode displaying a blank image on e-paper display unit and disabling detecting a touch input signal for the blank image.

In still another aspect of the present invention, a method for controlling a mobile device including an e-paper display unit comprises the steps of switching the mobile device to a first standby mode if a lack of a touch input signal is detected for a predetermined time, wherein the first standby mode is a mode displaying a first image on the e-paper display unit and disabling detecting of a touch input signal for the displayed first image; switching the mobile device to a second standby mode if a first standby switching signal is detected within the predetermined time, wherein the second standby mode is a mode displaying a second image on the e-paper display unit and disabling detecting of a touch input signal for the displayed second image; switching the mobile device to a first lock mode if a standby release signal is detected in the first standby mode, wherein the first lock mode is a mode displaying an unlock interface on the first image; and switching the mobile device to a second lock mode if the standby release signal is detected in the second standby mode, wherein the second lock mode is a mode displaying the unlock interface on the second image.

In further still another aspect of the present invention, a method for controlling a mobile device including an e-paper display unit comprises the steps of switching the mobile device to a first standby mode if a lack of a touch input signal is detected for a predetermined time, wherein the first standby mode is a mode displaying a first image on the e-paper display unit and disabling detecting of a touch input signal for the displayed first image; switching the mobile device to a second standby mode if a first standby switching signal is detected within the predetermined time, wherein the second standby mode is a mode displaying a second image on the e-paper display unit and disabling detecting of a touch input signal for the displayed second image; and switching the mobile device to a third standby mode if a second standby switching signal is detected within the predetermined time, wherein the third standby mode is a mode displaying a blank image on e-paper display unit and disabling detecting a touch input signal for the blank image.

According to one embodiment of the present specification, the user may use contents displayed in the e-paper display unit in the standby mode of the mobile device by using properties of the e-paper.

Also, according to another embodiment of the present specification, the user may provide various standby modes of the e-paper display unit by using various user inputs.

According to still another embodiment of the present specification, the user may easily recognize that detecting of the touch input signal has been disabled, through the touch off indicator displayed in the e-paper display unit in the standby mode.

According to further still another embodiment of the present specification, the lock mode of the additional display unit may be determined in various manners on the basis of the standby mode of the e-paper display unit.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings.

DETAILED DESCRIPTION OF THE INVENTION

Figure 1:
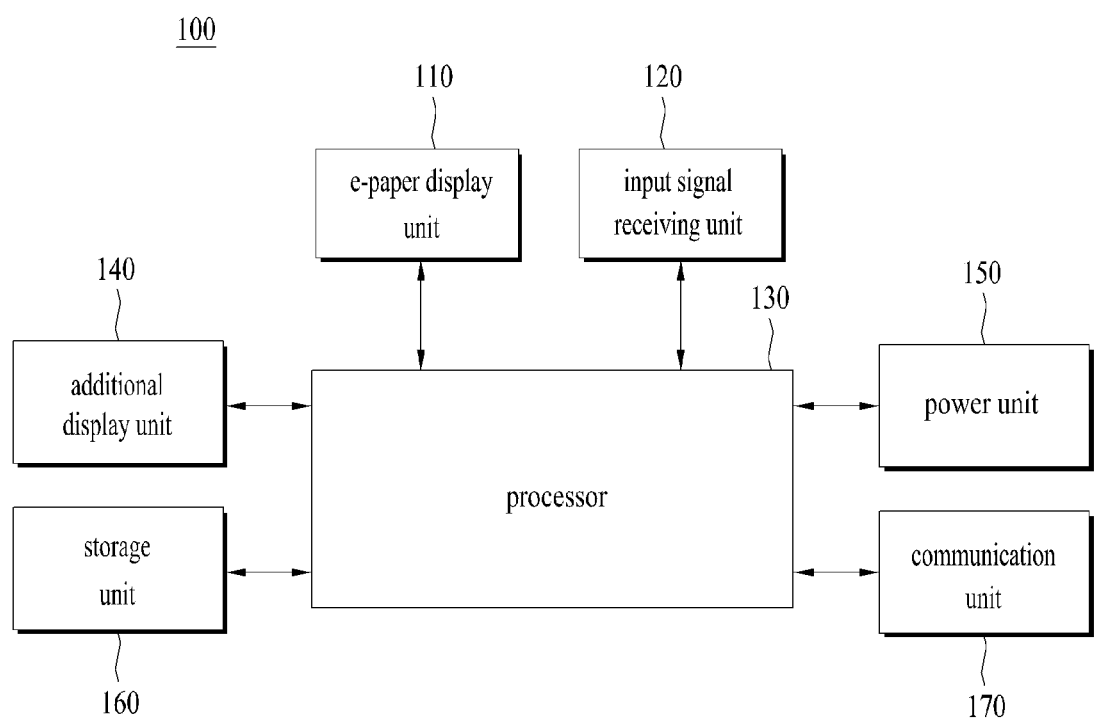
FIG. 1 is a block diagram illustrating a mobile device using an e-paper display panel according to the present specification.

Reference will now be made in detail to the preferred embodiments of the present specification, examples of which are illustrated in the accompanying drawings. Wherever possible, the same reference numbers will be used throughout the drawings to refer to the same or like parts.

Although the terms used in the present specification are selected from generally known and used terms considering their functions in the present specification, the terms can be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein.

Hereinafter, although the embodiments will be described with reference to the accompanying drawings and disclosures disclosed in the drawings, technical spirits of the present specification are not limited by such embodiments.

FIG. 1 is a block diagram illustrating a mobile device using an e-paper display panel according to the present specification. Referring to FIG. 1, the mobile device 100 that uses an e-paper display panel may include an e-paper display unit 110, an input signal receiving unit 120, a processor 130, an additional display unit 140, a power unit 150, a storage unit 160, and a communication unit 170.

First of all, the mobile device 100 according to one embodiment of the present specification means a portable terminal that may display contents, and may include a cellular phone, a smart phone, a personal digital assistant (PDA) and a portable multimedia player (PMP).

The e-paper display unit 110 may display information processed by the mobile device 100. For example, the e-paper display unit 110 may display a user interface (UI) and a graphic user interface (GUI), which are related to information processed by the processor 130. Also, the e-paper display unit 110 may include an e-paper display panel. The e-paper is a display type using e-ink, and may include a plurality of spherical capsules and a transistor located above and below the spherical capsules. In this case, a color of the spherical capsule may be changed by various electric impacts between transparent electric plates, and may display characters or images. Also, the e-paper display unit 110 may display contents due to properties of the e-paper even in case that the power is not supplied thereto. In other words, when the power is turned off, the e-paper display unit 110 may display contents displayed just before the power is turned off. In this specification, the mobile device 100 may indicate an active mode, a standby mode, and a lock mode through the e-paper display unit 110.

The input signal receiving unit 120 may detect an input signal received by the mobile device 100. For example, the input signal receiving unit 120 may detect an input of a user by using at least one sensor built in the mobile device 100 and forward the input signal based on the detected result to the processor 130. At this time, the input signal receiving unit 120 may includes a plurality of sensing means. In one embodiment, the plurality of sensing means may include a gravity sensor, a terrestrial magnetism sensor, a motion sensor, a gyroscope sensor, an acceleration sensor, an infrared sensor, an inclination sensor, a brightness sensor, an altitude sensor, a smell sensor, a temperature sensor, a depth sensor, a pressure sensor, a bending sensor, an audio sensor, a video sensor, a global positioning system (GPS) sensor, a grip sensor, a touch sensor, a proximity sensor. The input signal receiving unit 120 may refer to the aforementioned various sensing means. Also, the input signal receiving unit 120 may sense various inputs of a user and the environment of the mobile terminal and forward the sensed result to the processor 130, whereby the processor 130 may perform the operation based on the sensed result. Also, the aforementioned sensors may be included in the mobile device 100 as separate elements, or may be incorporated into at least one element. In this specification, the input signal receiving unit 120 may detect a touch input signal for the e-paper display unit 110. Also, in this specification, the input signal receiving unit 120 may detect a touch signal for an unlock interface.

In another embodiment, the input signal receiving unit 120 may detect an input of the user by using a physical button located in the mobile device 100, and may forward the input signal based on the detected result to the processor 130. At this time, the physical button may represent a hardware key located in the mobile device 100. For example, in this specification, the physical button may include a power button located at a side of the mobile device 100 or a home button located in front of the mobile device 100. In this specification, the input signal receiving unit 120 may detect a standby switching signal and a standby release signal by using the physical button. This will be described with reference to FIG. 2.

The processor 130 may implement contents received through data communication or contents stored in the storage unit 160. Also, the processor 130 may implement various applications, and may process data inside the mobile device 100. Also, the processor 130 may control the respective units of the mobile device 100, and may control data transmission and receiving between the units.

In this specification, if the processor 130 detects a lack of the touch input signal for a predetermined time, the mobile device 100 can be switched to a first standby mode. Also, if the processor 130 detects a first standby switching signal within a predetermined time, the mobile device 100 can be switched to a second standby mode. Also, if the processor 130 detects the standby release signal in the first standby mode, the mobile device 100 can be switched to a first lock mode. Also, if the processor 130 detects the standby release signal in the second standby mode, the mobile device 100 can be switched to a second lock mode. The operation of the processor 130 will be described in more detail with reference to FIG. 4 to FIG. 16.

The additional display unit 140 may display the information processed by the mobile device 100. For example, the additional display unit 140 may include a liquid crystal display (LCD), a thin film transistor liquid crystal display (TFT LCD), an organic light-emitting diode (OLED), a flexible display, a 3D display, etc. Also, for example, the additional display unit 140 may correspond to the display unit that uses the e-paper display panel. In this specification, the additional display unit 140 may selectively be provided in the mobile device 100.

The power unit 150 is a power source connected with a battery inside the mobile device 100 or an external power source, and may supply the power to the mobile device 100.

The storage unit 160 may store various digital data such as moving pictures, audios, photographs and applications. The storage unit 160 may store a program for processing and controlling the processor 130, and may perform a function for temporarily storing input/output data. The storage unit 160 may include various digital data storage areas, such as a flash memory, a random access memory (RAM), and a solid state drive (SSD).

The communication unit 170 may transmit and receive data to and from an external device by performing communication with the external device by using various protocols. Also, the communication unit 170 may transmit and receive digital data such as contents to and from a network by accessing the network through the wire or wireless. In this specification, the mobile device 100 may transmit and receive data to and from an external device or server by using the communication unit 170. Also, in this specification, the communication unit 170 may selectively be provided on the mobile device 100.

According to one embodiment of the present specification, various operations performed by the mobile device 100 may be controlled by the processor 130. Also, the operations of the mobile device 100 may be controlled by applications stored in the storage unit 160 and driven by the processor 130. For convenience of description, in the drawings and the following description, the operations are performed and controlled by the mobile device 100.

The mobile device 100 shown in FIG. 1 is a block diagram according to one embodiment. In FIG. 1, respective blocks are shown to logically identify the elements of the mobile device 100. Accordingly, the aforementioned elements of the mobile device 100 may be provided as one chip or a plurality of chips in accordance with design of the device.

Figure 2:
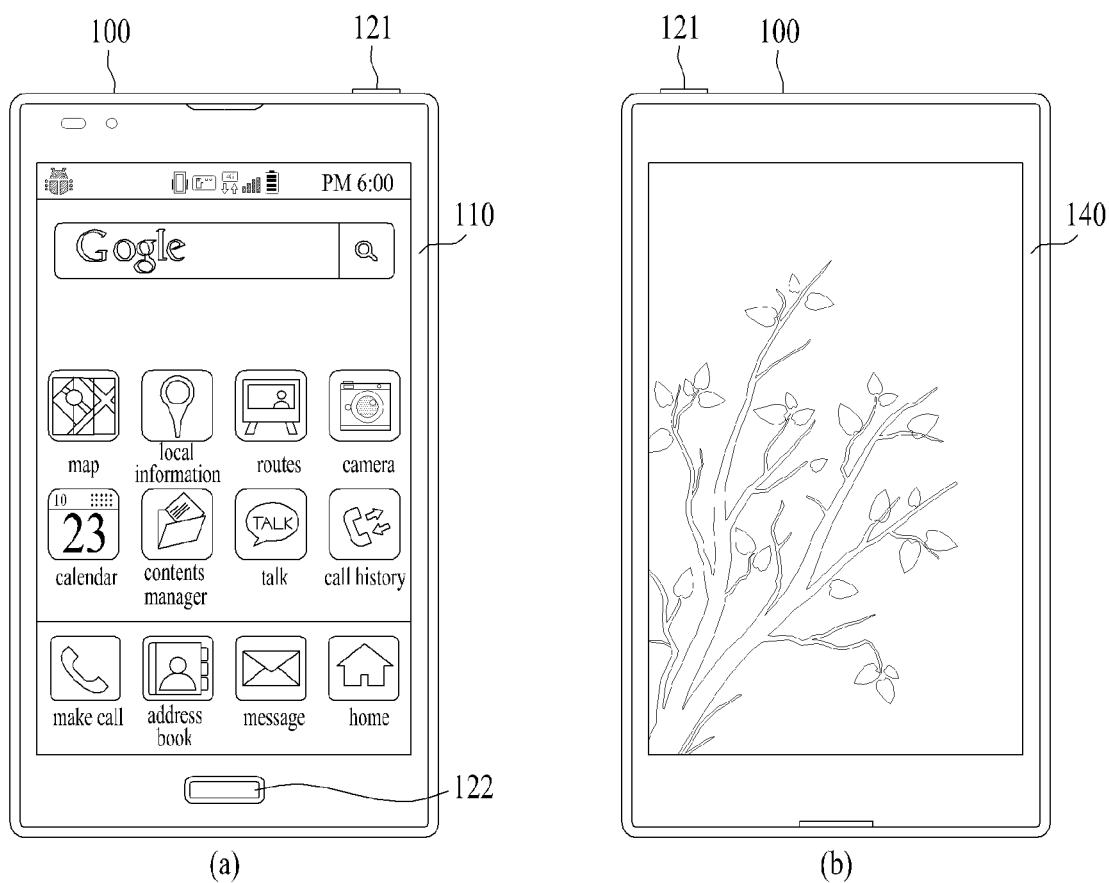
FIG. 2 is a diagram illustrating a display unit of a mobile device according to one embodiment of the present specification.

FIG. 2 is a diagram illustrating a display unit of a mobile device according to one embodiment of the present specification. In more detail, FIG. 2 illustrates a front side and a rear side of the mobile device 100 of the present specification.

First of all, referring to FIG. 2(*a*), the e-paper display unit 110 may be located at the front of the mobile device 100. In one embodiment, as described with reference to FIG. 1, the mobile device 100 may use the e-paper display unit 110 as a main display. Also, the mobile device 100 may arrange a home button 122 on the front. In this case, the home button 122 corresponds to a button that moves the mobile device 100 to a home screen while the user is using the mobile device 100. For example, in this specification, if the mobile device 100 detects an input for the home button 122, the mobile device 100 may move to the home screen displayed on the e-paper display unit 110. For example, the home button 122 may correspond to a hardware key or a software key. In this specification, it is assumed that the home button 122 is a hardware key. Next, referring to FIG. 2(*b*), the additional display unit 140 may be located at the rear side of the mobile device 100. In this case, the mobile device 100 may use the additional display unit as a sub display. In the meantime, for example, although not shown in FIG. 2, the additional display unit 140 may be located at the side of the e-paper display unit 10. Also, in this specification, the additional display unit 140 may selectively be provided.

Also, the e-paper display unit 110 or the additional display unit 140 may correspond to the display unit for allowing the user to implement contents as a main display of the mobile device 100 as the case may be. For example, the e-paper display unit 110 may be used for a display of text having low power consumption, and the additional display unit 140 may be used for a display of moving pictures and color contents, of which power consumption is high. In this specification, the e-paper display unit 110 is located at the front of the mobile device 100, and the additional display unit 140 is located at the rear side of the mobile device 100. In the meantime, the mobile device 100 may arrange a power button 121 at the side. In more detail, the power button 121 may be located at the upper end of the mobile device 100. In this case, the power button 121 corresponds to a button that turns the power of the mobile device 100 on or off. As described with reference to FIG. 1, the power button 121 may correspond to a hardware key.

Figure 3:
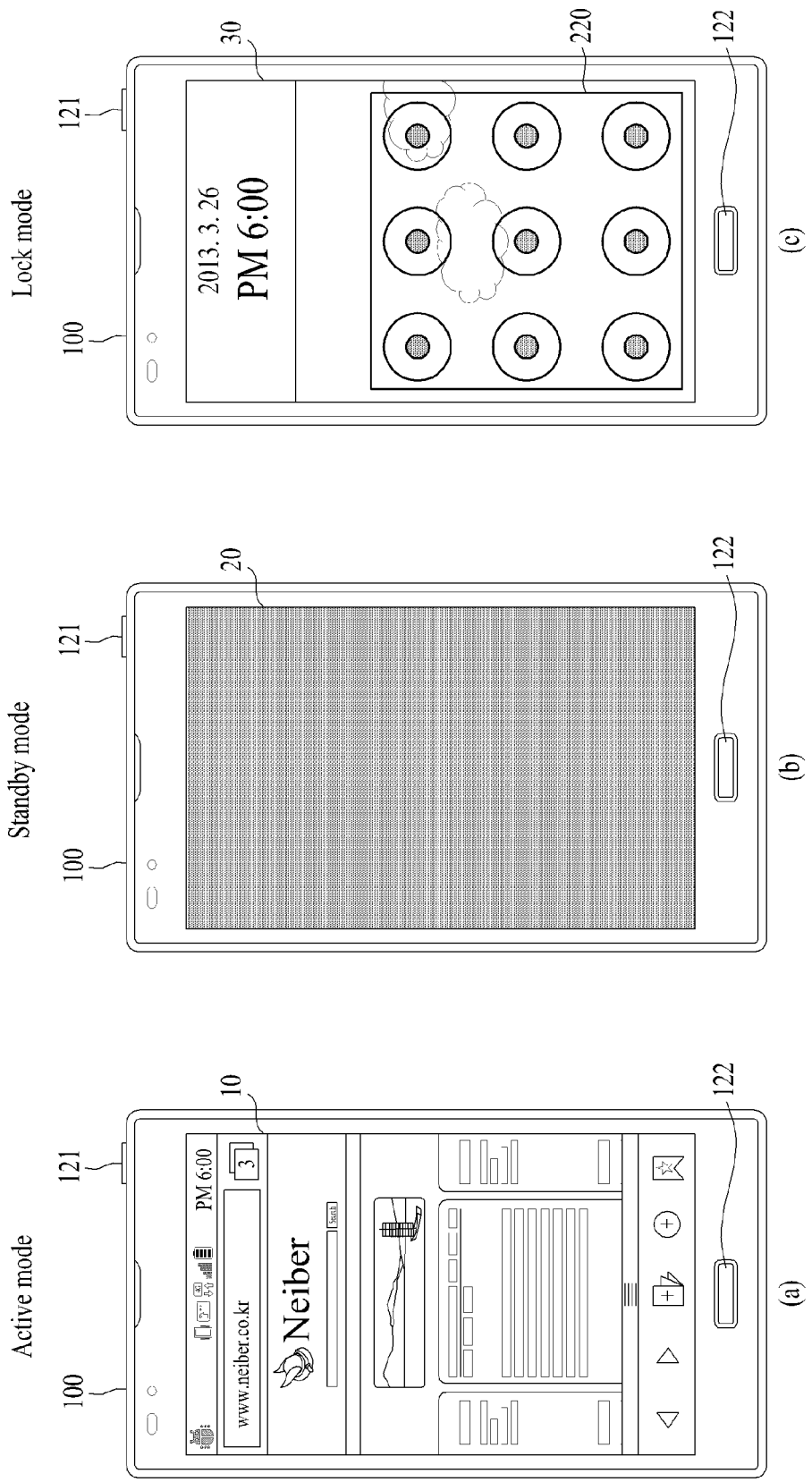
FIG. 3 is a diagram illustrating an active mode, a standby mode, and a lock mode of a mobile device according to one embodiment of the present specification.

FIG. 3 is a diagram illustrating an active mode, a standby mode, and a lock mode of a mobile device according to one embodiment of the present specification. Referring to FIG. 3, the mobile device 100 may include an active mode 10, a standby mode 20, and a lock mode 30.

First of all, the active mode 10 represents the state that all contents of the mobile device 100 may be used. Also, in the active mode 10, the mobile device 100 may detect a user input and display contents on the display unit on the basis of the detected user input. For example, in the active mode 10, the mobile device 100 may detect the touch input signal for the display unit and implement contents or applications on the basis of the detected touch input signal. Referring to FIG. 3(*a*), in the active mode 10, the mobile device 100 may display Internet contents on the e-paper display unit 110, and may detect the touch input signal.

Next, the standby mode represents a power saving mode of the mobile device 100. In other words, the standby mode 20 may correspond to the mode that reduces power consumption. Accordingly, in the standby mode 20, the mobile device 100 may not supply the power to the display unit. In one embodiment, the mobile device 100 may be switched to the standby mode 20 if the mobile device 100 is not used by the user continuously for a predetermined time. In another embodiment, the mobile device 100 may be switched to the standby mode 20 if the mobile device 100 detects the input signal for the power button 122. For example, as shown in FIG. 3(*b*), if the display unit uses a display panel such as LCD and LED, the mobile device may disable the display unit in the standby mode 20. In this case, disabling of the display unit may represent that no contents are displayed on the display unit and the display unit becomes black. In the meantime, if the display unit uses the e-paper display panel, the mobile device 100 may maintain contents in the standby mode 20 as it is, wherein the contents are displayed in the display unit just before the standby mode 20. In more detail, the mobile device 100 may maintain the image of the contents displayed on the display unit in the standby mode 20 as it is, wherein the image is displayed just before the standby mode 20. This is because that the already displayed e-ink may be maintained in view of properties of the e-paper even though the power is not supplied. This will be described with reference to FIG. 4.

Next, the lock mode 30 represents the state that use of the mobile device 100 is locked. In more detail, the lock mode 30 represents the state that, although predetermined contents are displayed on the display unit, detecting of the touch input signal for the displayed contents is disabled. In this case, the predetermined contents may correspond to the contents, such as clock and calendar, based on setting of the user. Also, for example, in the lock mode 30, the mobile device 100 may display an unlock interface 220. For example, if the mobile device 100 detects the input signal for the power button 121 or the home button 122, the mobile device 100 may be switched to the lock mode 30. The unlock interface 220 will be described with reference to FIG. 6.

Considering the aforementioned description, the present specification is intended to provide a method for displaying the standby mode 20 and the lock mode 30 on the basis of various input signals in the mobile device 100 that uses the e-paper display unit 110. This will be described with reference to FIG. 4 to FIG. 16.

Figure 4:
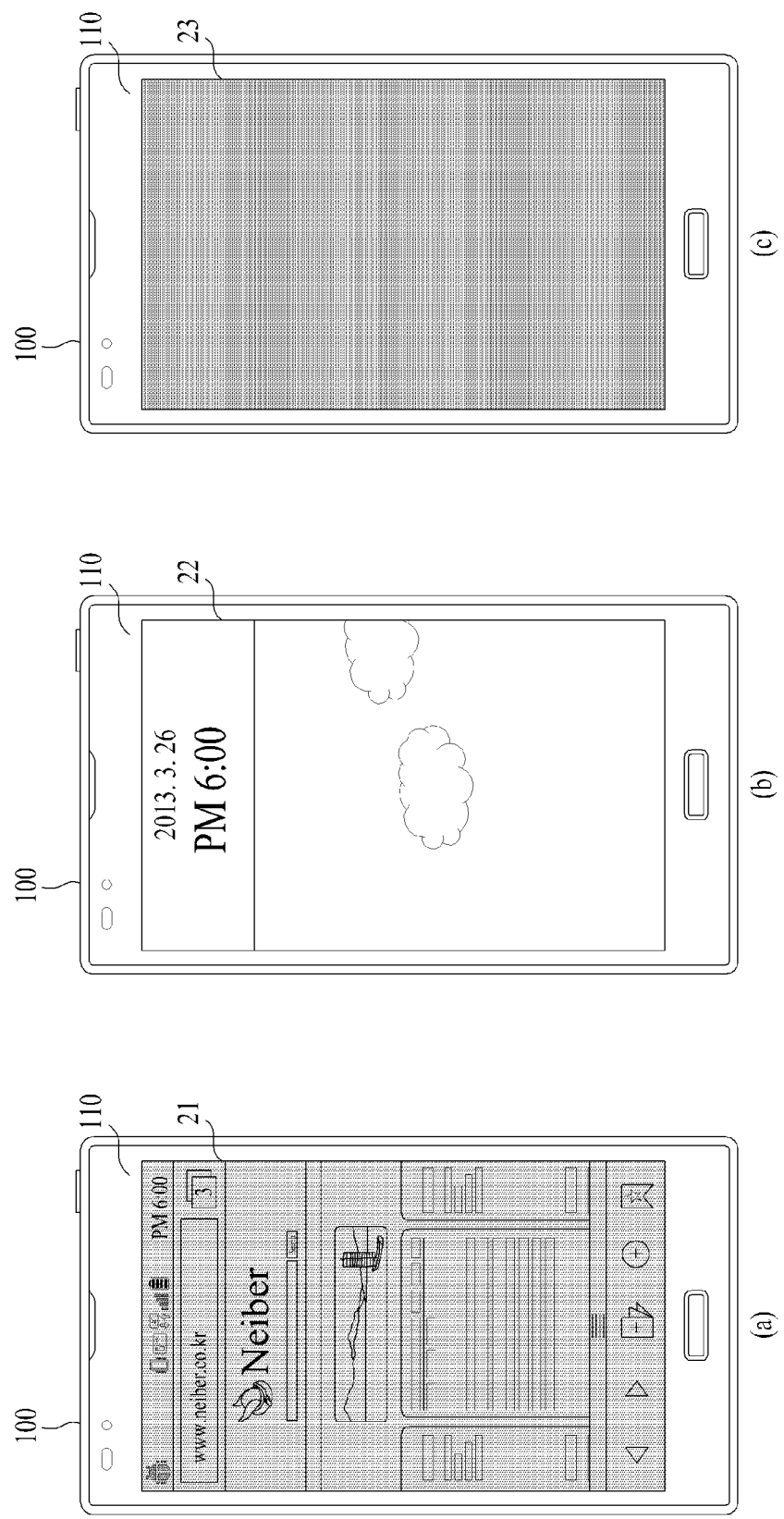
FIG. 4 is a diagram illustrating a standby mode of a mobile device according to one embodiment of the present specification.

FIG. 4 is a diagram illustrating a standby mode of a mobile device according to one embodiment of the present specification. In more detail, FIG. 4 illustrates three standby modes generated when the mobile device 100 uses the e-paper display panel.

First of all, as shown in FIG. 4(*a*), the mobile device 100 may include a first standby mode 21 of the e-paper display unit. In this case, the first standby mode 21 represents the state that the contents displayed just before the mobile device is switched to the standby mode continue to be maintained on the e-paper display unit 110. In more detail, the first standby mode 21 represents that the image of the contents displayed on the e-paper display unit 110 continues to be maintained, wherein the image is displayed just before the standby mode 21. However, in the first standby mode 21, the mobile device 100 may allow the e-paper display unit 110 to become dark while continuing to maintain the contents. This is because that the power is not supplied to the e-paper display unit 110 in the standby mode.

Also, the first standby mode 21 represents a mode that detecting of the touch input signal for the e-paper display unit is disabled. Referring to FIG. 4(a), in the first standby mode 21, the mobile device 100 may not detect the touch input signal for the contents displayed on the e-paper display unit 110 or may not perform the operation corresponding to the detected touch input signal. In the meantime, in this specification, if the mobile device 100 detects a lack of the touch input signal for the e-paper display unit 110 for a predetermined time, the mobile device 100 may be switched to the first standby mode 21. This will be described with reference to FIG. 7.

Next, as shown in FIG. 4(b), the mobile device 100 may include a second standby mode 22 of the e-paper display unit 110. In this case, the second standby mode 22 represents the state that predetermined contents are displayed on the e-paper display unit during standby mode switching. In more detail, the second standby mode 22 may correspond to the state that a still image of the predetermined contents is displayed. In this case, the mobile device 100 may maintain the predetermined contents as it is even in the standby state of power-off in view of properties of the e-paper. For example, the predetermined contents may include date and time contents, calendar contents, etc.

Also, the second standby mode 22 represents a mode that detecting of the touch input signal for the e-paper display unit 110 is disabled. Referring to FIG. 4(b), in the second standby mode 22, the mobile device 100 may not detect the touch input signal for the contents displayed on the e-paper display unit 110 or may not perform the operation corresponding to the detected touch input signal. In the meantime, in this specification, if the mobile device 100 detects a first standby switching signal within a predetermined time, the mobile device 100 may be switched to the second standby mode 22. This will be described with reference to FIG. 7.

Next, as shown in FIG. 4(c), the mobile device 100 may include a third standby mode 23 of the e-paper display unit 110. In this case, the third standby mode 23 represents the state that a black image is displayed on the e-paper display unit during standby mode switching. At this time, the blank image may include a single color image such as black and white. In this respect, in case of a liquid crystal display panel such as LCD and LED, if the power is not supplied to the liquid crystal display panel, the display unit becomes a black color. However, in case of the e-paper display panel, if the power is not supplied to the e-paper display panel, the contents displayed when the power is finally supplied to the e-paper display panel are maintained as they are. Accordingly, in the third standby mode 23, the mobile device 100 may separately display a single color image such as a black color image on the e-paper display unit 110.

Also, the third standby mode 23 represents a mode that detecting of the touch input signal for the e-paper display unit 110 is disabled. Referring to FIG. 4(c), in the third standby mode 23, the mobile device 100 may not detect the touch input signal for the contents displayed on the e-paper display unit 110 or may not perform the operation corresponding to the detected touch input signal. In the meantime, in this specification, if the mobile device 100 detects a second standby switching signal within a predetermined time, the mobile device 100 may be switched to the third standby mode 23. This will be described with reference to FIG. 7.

Figure 5:
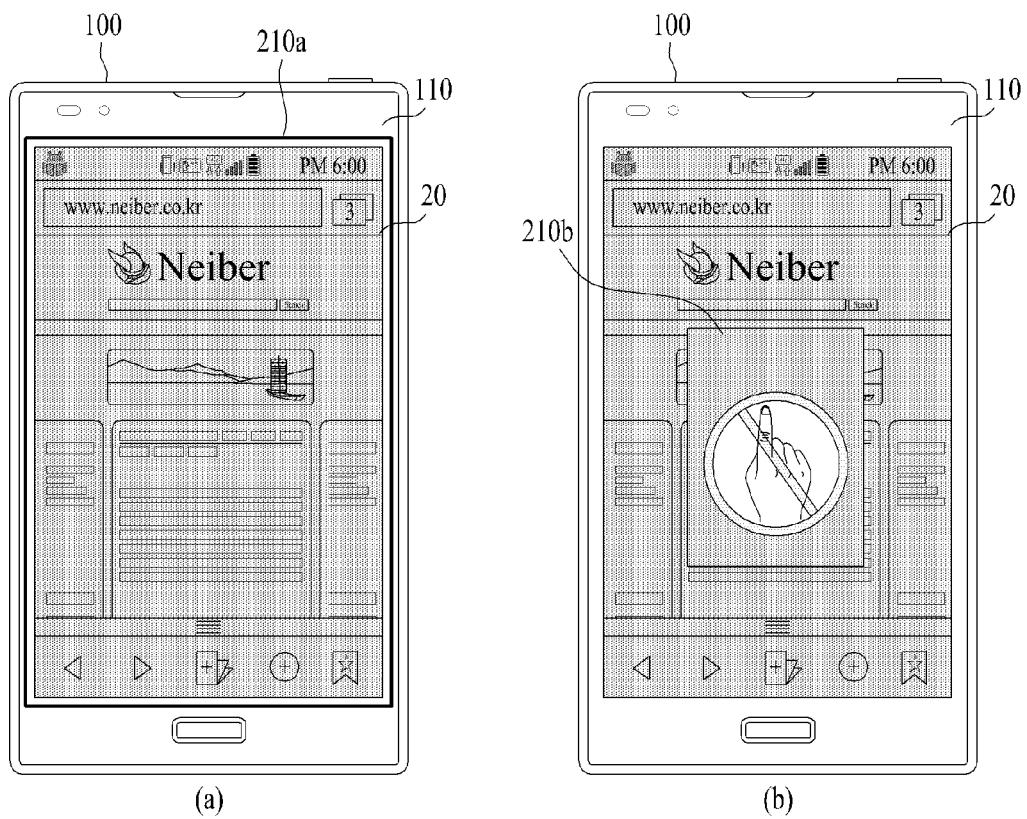
FIG. 5 is a diagram illustrating a touch lock indicator in a standby mode of a mobile device according to one embodiment of the present specification.

FIG. 5 is a diagram illustrating a touch lock indicator in a standby mode of a mobile device according to one embodiment of the present specification. In more detail, FIG. 5 illustrates a touch off indicator 210 displayed in a standby mode if the e-paper display unit is used.

First of all, if the e-paper display unit is used, as described with reference to FIG. 4, in the standby mode 20, the same contents as those of the active mode may be maintained. In this case, in order to identify the standby mode from the active mode, in the standby mode 20, the mobile device 100 may display the touch off indicator 210 on the e-paper display unit 110. At this time, the touch off indicator 210 may represent that detecting of a touch input through the mobile device 100 switched to the standby mode 20 is disabled. For example, referring to FIG. 5(a), the mobile device 100 may display a solid line 210a on the border of the e-paper display unit 110 as the touch off indicator. Also, for example, referring to FIG. 5(b), the mobile device 100 may display a hand shaped touch off indicator 210b on the e-paper display unit 110. At this time, the shape of the touch off indicator 210b may include a lock shape, a hand shape, etc. In the meantime, although the touch off indicator 210 shown in FIG. 5 is based on the first standby mode shown in FIG. 4 as an example, the mobile device 100 may equally be applied to the first to third standby modes.

Figure 6:
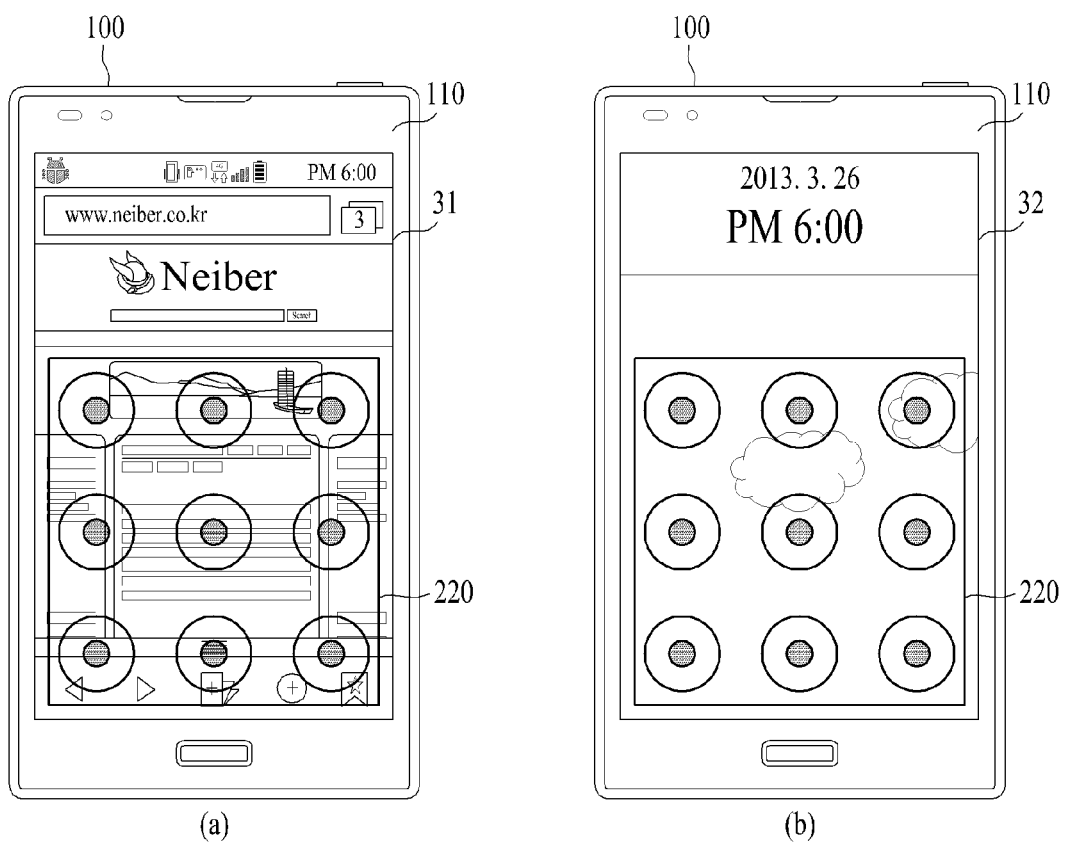
FIG. 6 is a diagram illustrating a lock mode of a mobile device according to one embodiment of the present specification.

FIG. 6 is a diagram illustrating a lock mode of a mobile device according to one embodiment of the present specification. In more detail, FIG. 6 illustrates two types of lock modes occurring if the mobile device 100 uses the e-paper display panel.

First of all, as shown in FIG. 6(a), the mobile device 100 may include a first lock mode 31 for the e-paper display unit 110. In this case, the first lock mode 31 may represent that an unlock interface 220 is displayed in the first standby mode shown in FIG. 4(a). In other words, the first lock mode 31 may represent that the image displayed on the e-paper display unit 110 and the unlock interface 220 are displayed when the mobile device 100 is switched to the first standby mode. Also, in the first lock mode 31, the mobile device 100 may disable detecting of the touch input signal for the zone except for the unlock interface 200. In other words, in the first lock mode 31, the mobile device 100 may detect the touch input signal for the unlock interface 200.

Next, as shown in FIG. 6(b), the mobile device 100 may include a second lock mode 32 for the e-paper display unit 100. In this case, the second lock mode 32 may represent that the unlock interface 220 is displayed in the second standby mode shown in FIG. 4(b). In other words, the second lock mode 32 may represent that the mobile device 100 displays the image of the predetermined contents and the unlock interface 220. In the meantime, if the mobile device 100 detects a standby release signal, the mobile device 100 may be switched to the first lock mode 31 or the second lock mode 32. This will be described with reference to FIG. 8. Also, in the second lock mode 32, the mobile device 100 may disable detecting of the touch input signal for the zone except for the unlock interface 200. In other words, in the second lock mode 32, the mobile device 100 may detect the touch input signal for the unlock interface 200.

In the meantime, the unlock interface 220 represents the interface for switching to the active mode by unlocking the lock mode. For example, the unlock interface 220 may include a sliding interface, a pattern recognition interface, a face recognition interface, a number recognition interface and a fingerprint recognition interface. Referring to FIG. 6, the mobile device 100 may display the pattern recognition interface 220 on the e-paper display unit 110. Accordingly, if the mobile device 100 detects a touch input for a pattern predetermined in the pattern recognition interface 20, it may be released from the lock mode and then may be switched to the active mode.

Figure 7:
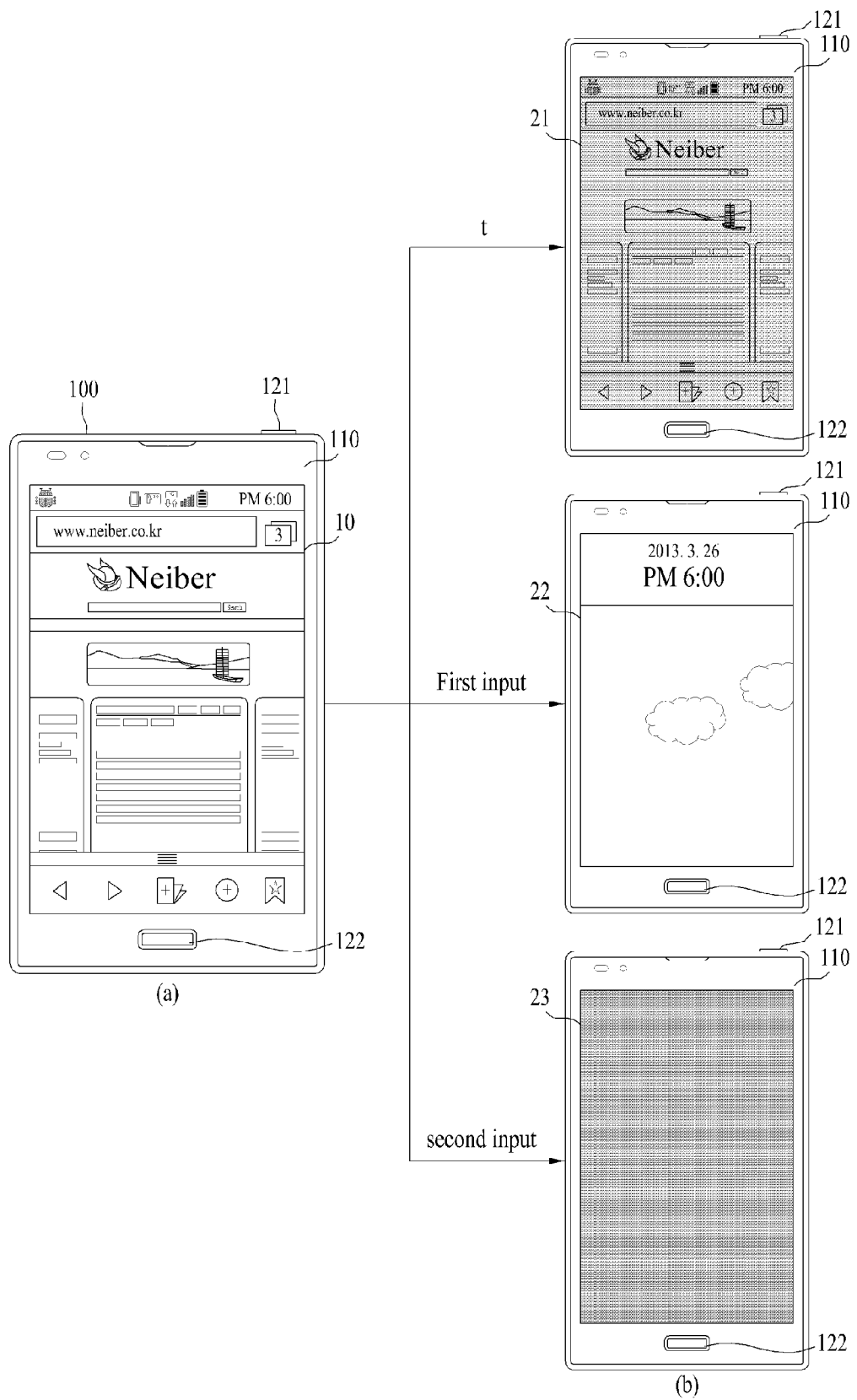
FIG. 7 is a diagram illustrating switching from an active mode to a standby mode of a mobile device according to one embodiment of the present specification.

FIG. 7 is a diagram illustrating switching from an active mode to a standby mode of a mobile device according to one embodiment of the present specification. In more detail, FIG. 7 illustrates switching of the mobile device 100 from the active mode 10 to the standby mode 20 in accordance with an input condition. FIG. 7(a) illustrates the active mode 10 of the mobile device 100, and FIG. 7(b) illustrates the standby mode 20 of the mobile device 100.

First of all, in the active mode 10, the mobile device 100 may display contents on the e-paper display unit 110. Also, as described with reference to FIG. 3, in the active mode 10, the mobile device 100 may detect an input signal and display contents or application on the basis of the detected input signal.

Next, if the mobile device 100 detects a lack of a user input for a predetermined time 't', the mobile device 100 may be switched to the first standby mode 21. In this case, the predetermined time 't' may include a time set by the user or a time set automatically in the mobile device 199. For example, the predetermined time 't' may include 10 seconds, 20 seconds, 30 seconds, etc. As described with reference to FIG. 4(a), the first standby mode 21 represents the state that contents displayed on the e-paper display unit 110 during switching to the standby mode continue to be maintained. Accordingly, in the first standby mode 21, the user may use the contents used in the active mode 10 as they are. However, since the power has not been supplied to the display unit in the standby mode, the contents displayed on the e-paper display unit 100 in the first standby mode 21 may not be changed in accordance with the time. Also, in the first standby mode 21, the mobile device 100 may disable detecting of the touch input signal for the e-paper display unit 110. Also, as shown in FIG. 7(b), the mobile device 100 may notify the user of switching to the first standby mode 21 considering that brightness of the contents displayed in the active mode 10 becomes dark.

Also, if the mobile device 100 detects a first input within the predetermined time 't', the mobile device 100 may be switched to the second standby mode 22. In this case, the first input may represent a first standby switching signal input. For example, the first input may include a single input for the power button 121. As described with reference to FIG. 4(b), the second standby mode 22 represents the state that the predetermined contents are displayed on the e-paper display unit when the mobile device 100 is switched to the standby mode. Also, in the second standby mode 22, the mobile device 100 may disable detecting of the touch input signal for the e-paper display unit 110. Also, as shown in FIG. 7(b), the mobile device 100 may notify the user of switching to the second standby mode 22 considering that the predetermined contents not the contents used in the active mode 10 are displayed.

Also, if the mobile device 100 detects a second input within the predetermined time 't', the mobile device 100 may be switched to the third standby mode 23. In this case, the second input may represent a second standby switching signal input. For example, the second input may include a multi-input and a long input through the power button 121. Also, the second input is not limited to the multi-input and the long input, and may include all the inputs that may be identified from the first input. As described with reference to FIG. 4(c), the third standby mode 23 represents the state that a blank image is displayed on the e-paper display unit when the mobile device 100 is switched to the standby mode. Also, in the third standby mode 23, the mobile device 100 may disable detecting of the touch input signal for the e-paper display unit 110. Also, as shown in FIG. 7(b), the mobile device 100 may notify the user of switching to the third standby mode 23 by displaying the blank image on the e-paper display unit 110.

Figure 8:
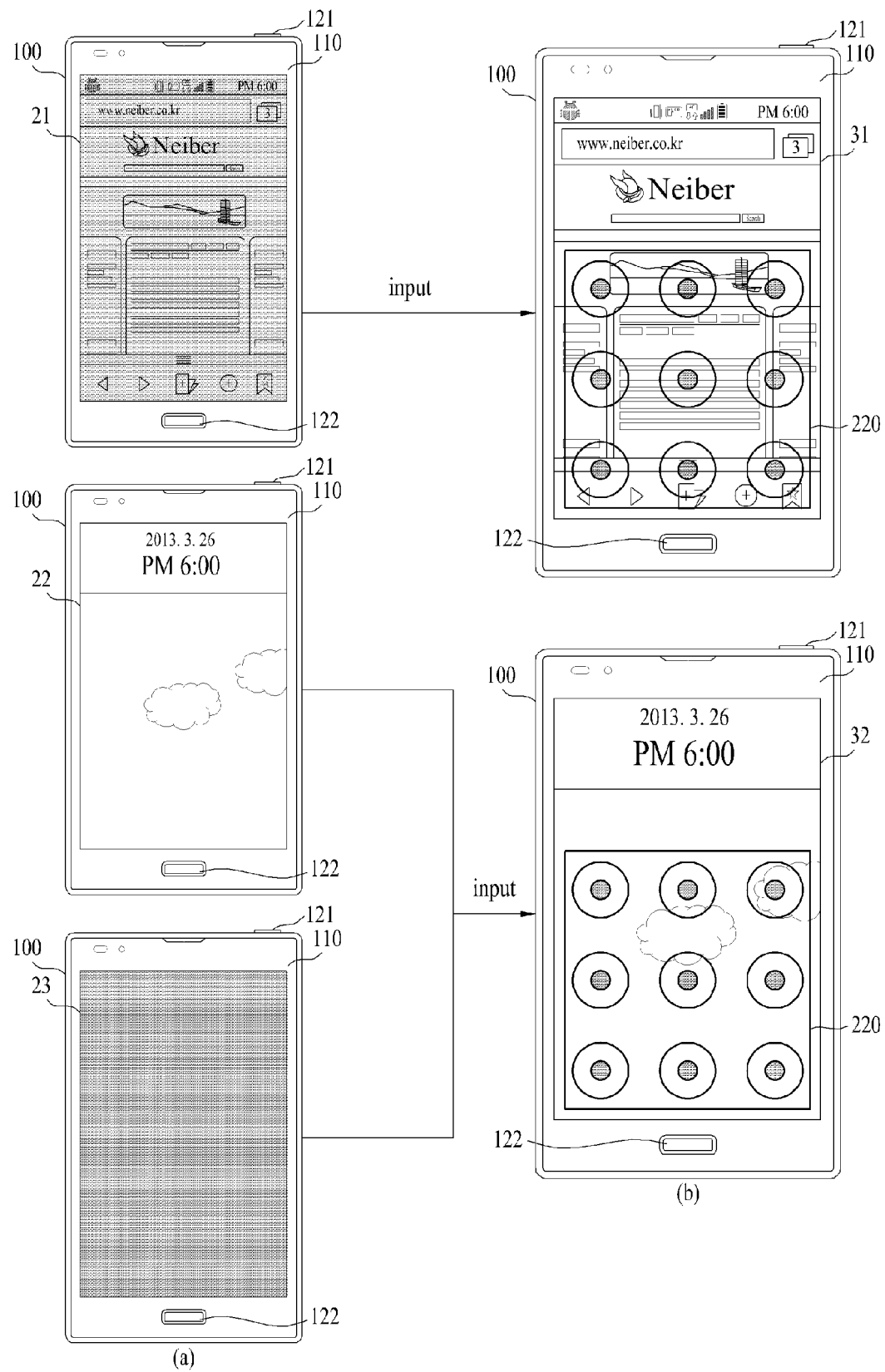
FIG. 8 is a diagram illustrating switching from a standby mode to an active mode of a mobile device according to one embodiment of the present specification.

FIG. 8 is a diagram illustrating switching from a standby mode to an active mode of a mobile device according to one embodiment of the present specification. In more detail, FIG. 8 illustrates switching of the mobile device 100 from the standby mode 20 to the lock mode 30 in accordance with an input condition. FIG. 8(a) illustrates the standby mode 20 of the mobile device 100, and FIG. 8(b) illustrates the lock mode 30 of the mobile device 100.

First of all, if the mobile device detects the input signal in the standby modes 21, 22 and 23, the mobile device 100 may be switched to the lock modes 31 and 32. In this case, the input signal may correspond to the standby release signal. For example, the standby release signal may correspond to the input signal for the power button 121 or a home button (not shown). However, if the mobile device 100 detects a lack of the input signal, the mobile device 100 may be maintained in the standby modes 21, 22 and 23 without switching to the lock mode 30.

In one embodiment, if the mobile device 100 detects the input signal in the first standby mode 21, the mobile device 100 may be switched to the first lock mode 31. As described with reference to FIG. 6(a), the first lock mode 31 may represent that the unlock interface 220 is displayed in the first standby mode. In this case, the unlock interface 220 may include a sliding interface, a pattern recognition interface, a face recognition interface, a number recognition interface and a fingerprint recognition interface as described in FIG. 6. In another embodiment, if the mobile device 100 detects the input signal in the second standby mode 22, the mobile device 100 may be switched to the second lock mode 32. As described with reference to FIG. 6(b), the second lock mode 32 may represent that the unlock interface 220 is displayed in the second standby mode. Also in another embodiment, if the mobile device 100 detects the input signal in the third standby mode 23, the mobile device 100 may be switched to the second lock mode 32. In more detail, if the mobile device 100 detects the input signal in the third standby mode 23, the mobile device 100 may display the predetermined contents and the unlock interface 220 on the e-paper display unit 110.

Figure 9:
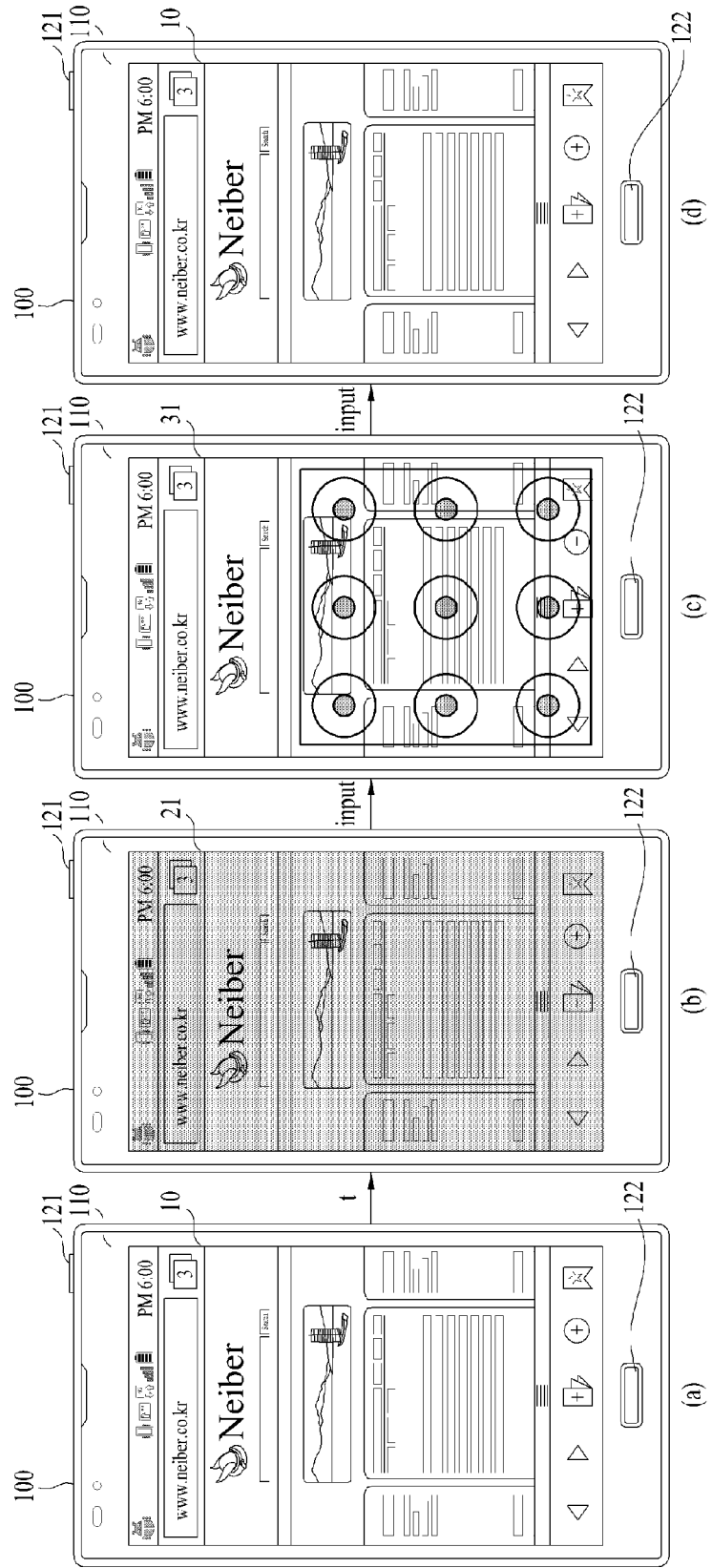
FIG. 9 is a diagram illustrating a first example of mode switching of a mobile device according to one embodiment of the present specification.

FIG. 9 is a diagram illustrating a first example of mode switching of a mobile device according to one embodiment of the present specification. In more detail, FIG. 9 illustrates switching of the mobile device 100 from the active mode 10 to the first standby mode and the first lock mode. FIG. 9(a) represents the active mode 10, FIG. 9(b) illustrates the first standby mode 21, FIG. 9(c) illustrates the first lock mode 31, and FIG. 9(d) illustrates the active mode 10.

Referring to FIG. 9, if the mobile device 100 detects a lack of an input signal for a predetermined time 't' in the active mode 10, the mobile device 100 may be switched to the first standby mode 21. Also, the mobile device 100 may notify the user that detecting of the touch input has been disabled by displaying the touch off indicator (not shown) in the first standby mode 21. Next, if the mobile device detects a standby release signal in the first standby mode 21, the mobile device 100 may be switched to the first lock mode 31. In this case, the mobile device 100 may display the unlock interface 220. For example, the standby release signal may include an input signal for the home button 122 or the power button 121 of the mobile device 100. Referring to FIG. 9(b), the unlock interface 220 may correspond to the pattern recognition interface.

Next, if the mobile device detects an unlock signal in the first lock mode 31, the mobile device 100 may be switched to the active mode 10. In this case, the unlock signal may correspond to the touch input signal for the unlock interface. For example, in FIG. 9(c), the unlock signal may correspond to the touch input signal constituting the predetermined pattern in the unlock interface 220. Also, the mobile device 100 may display the same contents as those displayed just before the first standby mode 21, in the active mode 10.

Through the first example, the user may use the contents used in the active mode as they are even in the lock mode or identify the contents.

Figure 10:
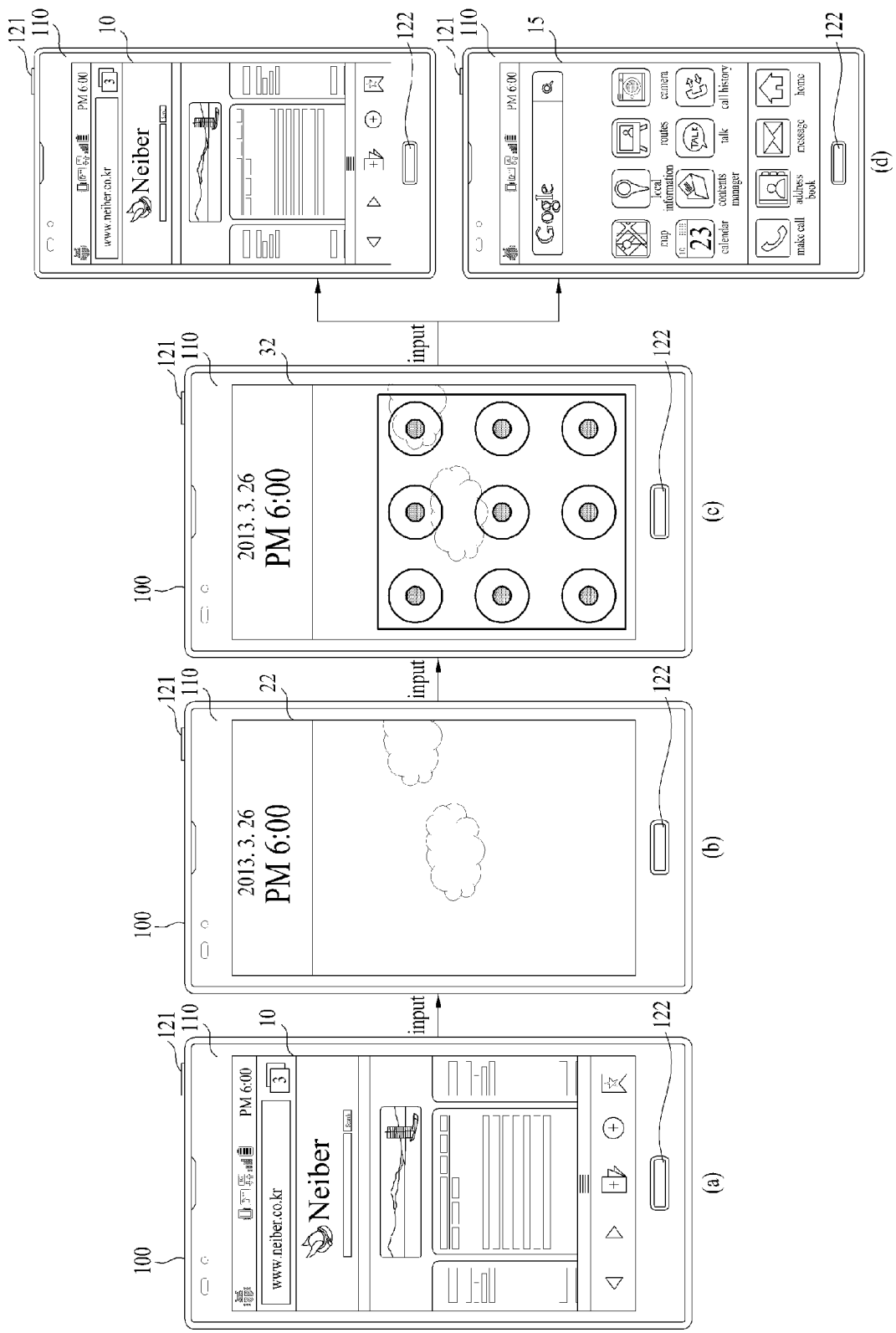
FIG. 10 is a diagram illustrating a second example of mode switching of a mobile device according to one embodiment of the present specification.

FIG. 10 is a diagram illustrating a second example of mode switching of a mobile device according to one embodiment of the present specification. In more detail, FIG. 10 illustrates switching of the mobile device 100 from the active mode 10 to the second standby mode and the second lock mode. FIG. 10(a) represents the active mode 10, FIG. 10(b) illustrates the second standby mode 22, FIG. 10(c) illustrates the second lock mode 32, and FIG. 10(d) illustrates the active mode 10.

Referring to FIG. 10, if the mobile device 100 detects an input signal within a predetermined time in the active mode 10, the mobile device 100 may be switched to the second standby mode 22. In this case, the input signal may correspond to the first standby switching signal. For example, the first standby switching signal may include a single input signal based on the power button 121 of the mobile device 100. Also, the mobile device 100 may notify the user that detecting of touch input has been disabled, by displaying the touch off indicator (not shown) on the e-paper display unit 110. Next, if the mobile device 100 detects a standby release signal within a predetermined time in the second standby mode 22, the mobile device 100 may be switched to the second lock mode 32. For example, the standby release signal may correspond to the input signal for the home button 122 or the power button 121. In this case, the mobile device 100 may display the unlock interface 220. Referring to FIG. 10, the unlock interface 220 may correspond to the pattern recognition interface.

Next, if the mobile device detects the unlock signal in the second lock mode 32, the mobile device 100 may be switched to the active mode 10. In this case, the unlock signal may correspond to the touch input signal for the unlock interface as described in FIG. 9. In one embodiment, referring to the upper end of FIG. 10(d), the mobile device 100 may display the same contents as those displayed just before the second standby mode 22, in the active mode 10. Also, in another embodiment, referring to the lower end of FIG. 10(d), the mobile device 100 may display the home screen 15 in the active mode. The contents displayed in the active mode 10 may be set by the user.

Through the second example, the user may identify the contents set by the user even in the standby mode by displaying the predetermined contents in the standby mode.

Figure 11:
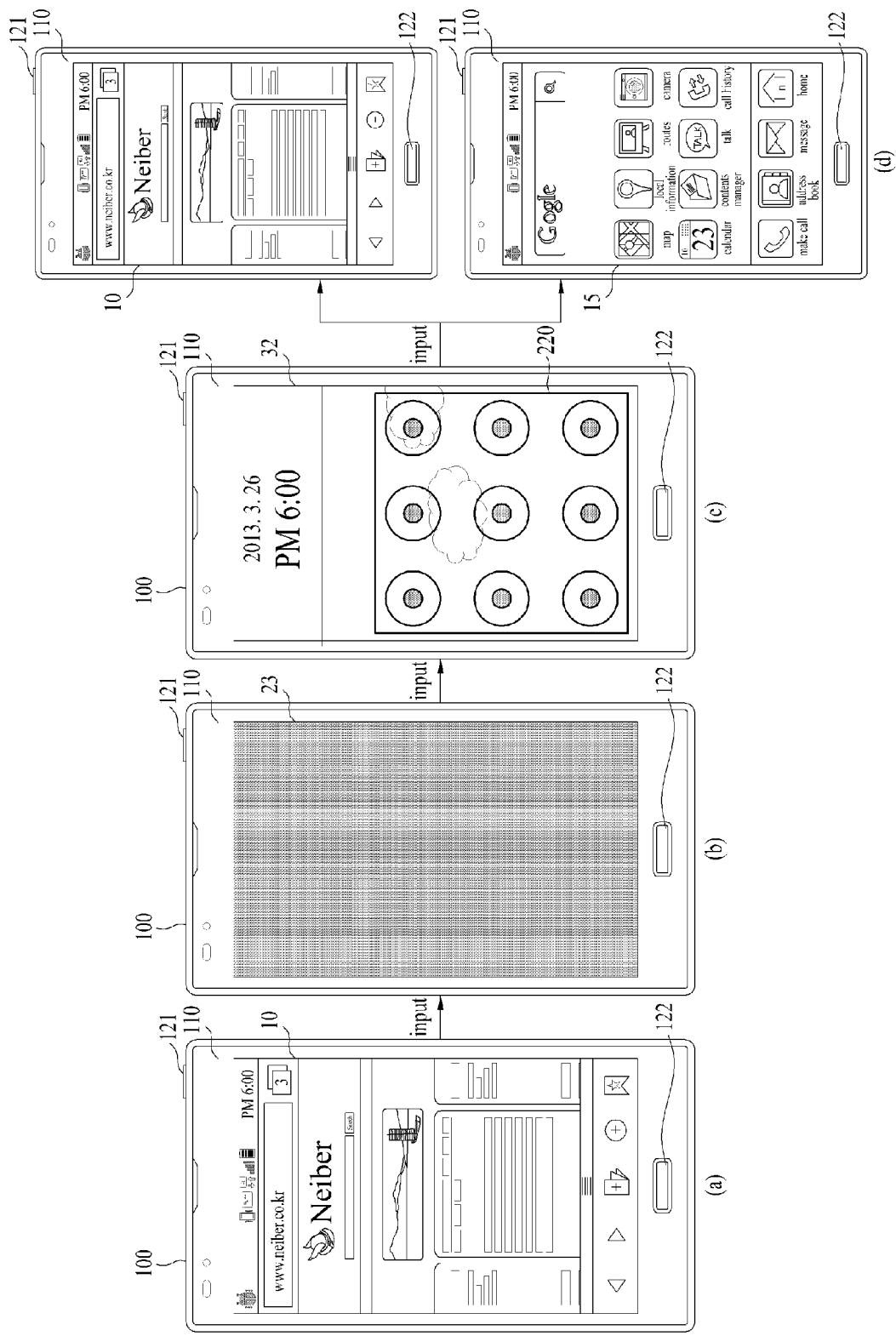
FIG. 11 is a diagram illustrating a third example of mode switching of a mobile device according to one embodiment of the present specification.

FIG. 11 is a diagram illustrating a third example of mode switching of a mobile device according to one embodiment of the present specification. In more detail, FIG. 11 illustrates switching of the mobile device 100 from the active mode 10 to the third standby mode 23 and the second lock mode 32. FIG. 11(a) represents the active mode 10, FIG. 11(b) illustrates the third standby mode 22, FIG. 11(c) illustrates the second lock mode 32, and FIG. 11(d) illustrates the active mode 10.

Referring to FIG. 11, if the mobile device 100 detects an input signal within a predetermined time in the active mode 10, the mobile device 100 may be switched to the third standby mode 23. In this case, the input signal may correspond to the second standby switching signal. For example, the second standby switching signal may include a multi-input, a long input, etc. based on the power button 121. Also, the mobile device 100 may notify the user that detecting of touch sensing has been disabled, by displaying the touch off indicator (not shown) in the third standby mode 23. Next, if the mobile device 100 detects the standby release signal in the third standby mode 23, the mobile device 100 may be switched to the second lock mode 32. In this case, the mobile device 100 may display the unlock interface 220.

Next, if the mobile device detects the unlock signal in the second lock mode 32, the mobile device 100 may be switched to the active mode 10. In this case, the unlock signal may correspond to the touch input signal for the unlock interface 220 as described in FIG. 9. In this case, in one embodiment, referring to the upper end of FIG. 11(d), the mobile device 100 may display the same contents as those displayed just before the second standby mode 22, in the active mode 10. Also, in another embodiment, referring to the lower end of FIG. 11(d), the mobile device 100 may display the home screen 15 in the active mode. The contents displayed in the active mode 10 may be set by the user.

Through the third example, the blank image may be displayed on the e-paper display unit in accordance with selection of the user, whereby the same standby mode as that of the mobile device, which uses the liquid crystal display panel, may be obtained.

Figure 12:
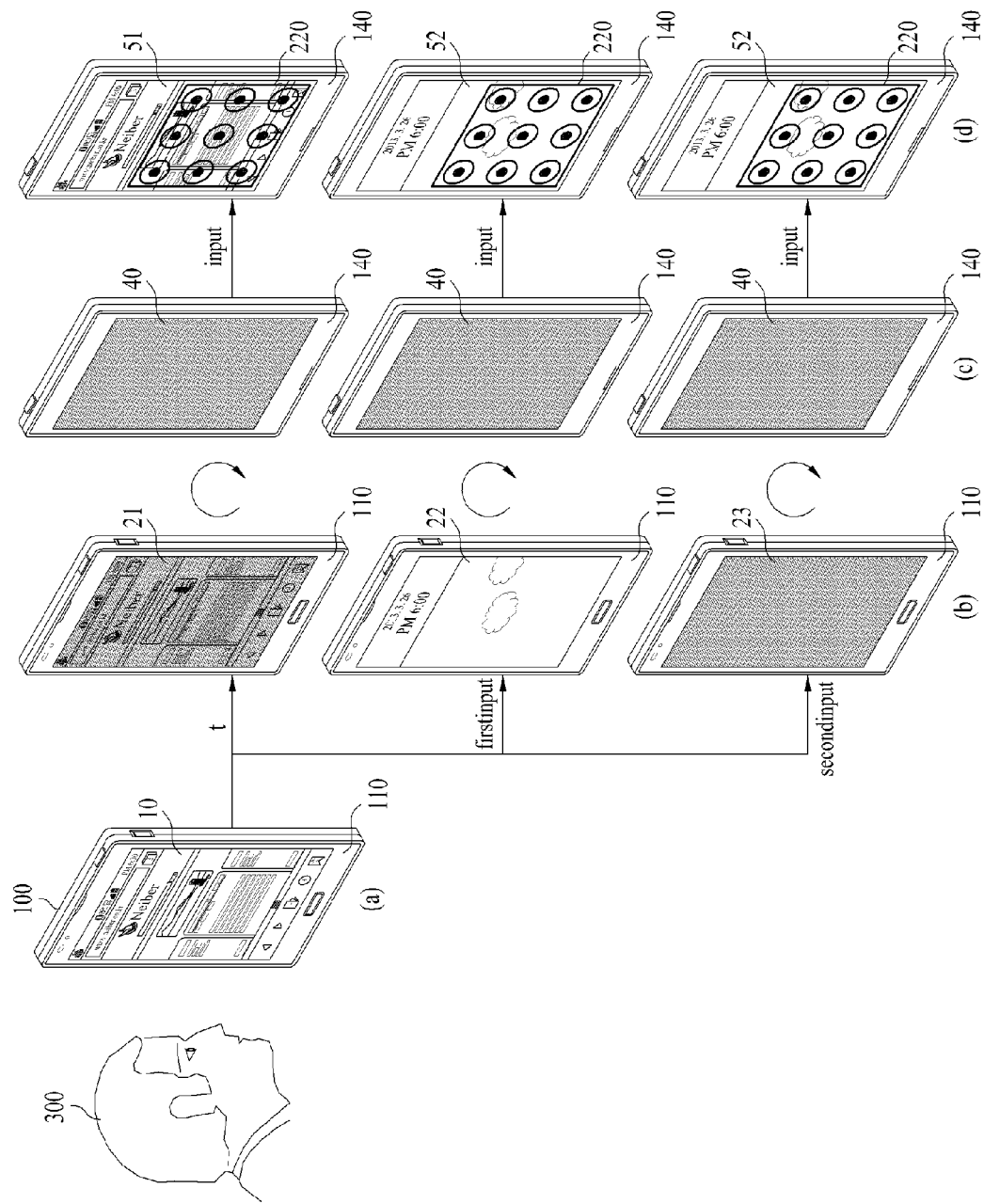
FIG. 12 is a diagram illustrating an example of a mobile device according to one embodiment of the present specification.

FIG. 12 is a diagram illustrating an example of a mobile device according to one embodiment of the present specification. In more detail, FIG. 12 illustrates contents displayed on the additional display unit if the mobile device is switched to the standby mode while the user 300 is using the e-paper display unit 110. FIG. 12(a) illustrates the active mode 10 of the e-paper display unit 110, FIG. 12(b) illustrates the standby mode 20 of the e-paper display unit 110, FIG. 12(c) illustrates the standby mode 40 of the additional display unit 140, and FIG. 12(d) illustrates the lock mode 50 of the additional display unit 140. Also, the following description will be made on the assumption that the additional display unit 140 is the display unit that uses the liquid crystal display panel.

First of all, referring to FIG. 12(a), in the active mode 10, the mobile device 100 may use the e-paper display unit 110 through the user 300. In other words, at this time, the e-paper display unit 110 of the mobile device 100 may be located towards the user 300. In this case, referring to FIG. 12(b), if the mobile device 100 detects a lack of the touch input signal for a predetermined time, the mobile device 100 may be switched to the first standby mode 21. Also, if the mobile device 100 detects the first standby switching signal within the predetermined time 't', the mobile device 100 may be switched to the second standby mode 22. Also, if the mobile device 100 detects the second standby switching signal within the predetermined time 't', the mobile device 100 may be switched to the third standby mode 23.

Next, referring to FIG. 12(c), the mobile device 100 may be located in such a manner that the additional display unit 140 is towards the user 300, in the first to third standby modes. In other words, if the additional display unit 140 is located at the rear side of the e-paper display unit 110, the mobile device 100 may be located towards the user 300 by rotation of the mobile device 100. In this case, as shown in FIG. 12(c), since the additional display unit 140 of the mobile device 100 is in the standby mode 40, the mobile device 100 may be deactivated.

Next, referring to FIG. 12(d), the mobile device 100 may detect the standby release signal in a state that the additional display unit 140 is towards the user 300 by rotation. In this case, the standby release signal may correspond to the input signal based on the power button (not shown). In one embodiment, the mobile device 100 may be switched to a first lock mode 51 in a state that the e-paper display unit 110 is towards the user 300. In this case, the first lock mode 51 may correspond to the mode for displaying the same contents as those of the first lock mode 31 shown in FIG. 6. Accordingly, the mobile device 100 may display the contents displayed when the mobile device 100 is switched to the first standby mode 21 and the unlock interface 220 on the additional display unit 140. In another embodiment, the mobile device 100 may be switched to a second lock mode 52 in a state that the e-paper display unit 110 is towards the user 300. In this case, the second lock mode 52 may correspond to the mode for displaying the same contents as those of the second lock mode 32 shown in FIG. 6. Accordingly, the mobile device may display the predetermined contents and the unlock interface 220 on the additional display unit 140.

In the meantime, although not shown in FIG. 12, the mobile device 100 may display the image of the contents displayed on the e-paper display unit 110 in the first to third standby modes 21, 22 and 23, as they are in the lock mode. This is because that the user 300 may mainly use the additional display unit 140 as the additional display unit 140 is towards the user 300 in the lock mode. Accordingly, the mobile device 100 is not required to change the displayed image by supplying the power to the e-paper display unit 110.

Through the embodiment of FIG. 12, the user may perform switching of the standby mode and the lock mode in the e-paper display unit 110 even through the e-paper display unit and the additional display unit 140.

Figure 13:
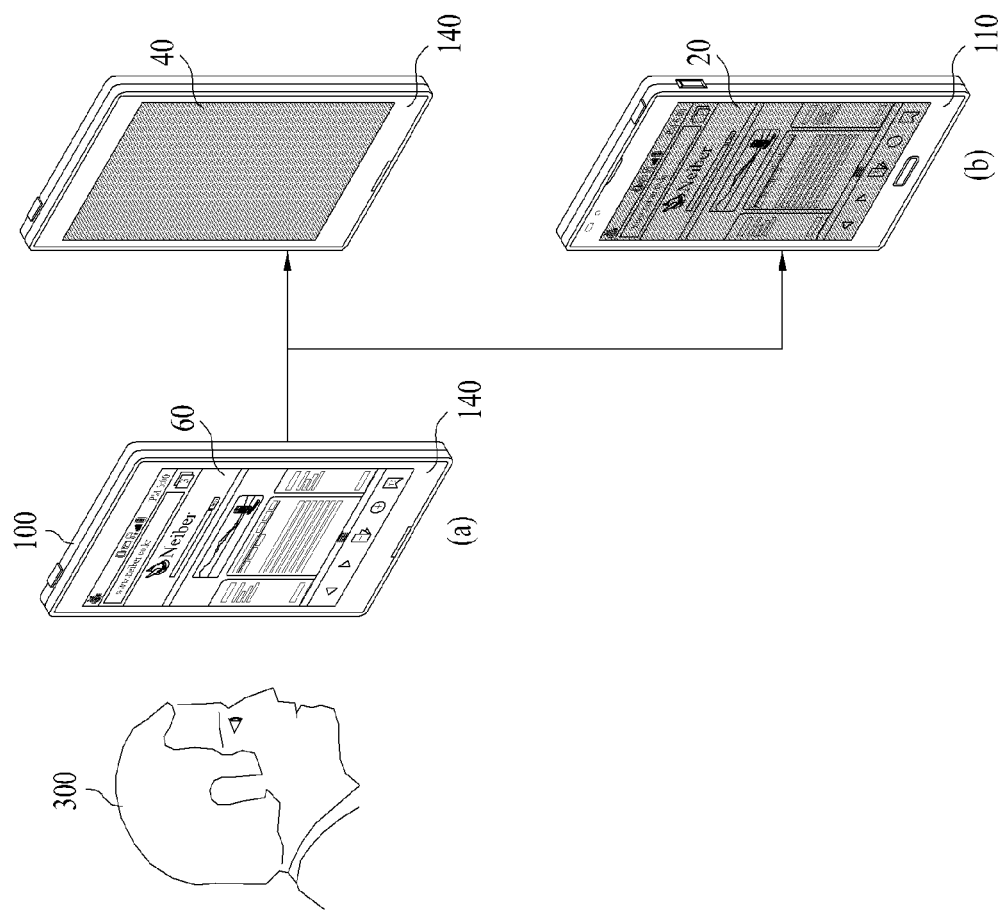
FIG. 13 is a diagram illustrating another example of a mobile device according to one embodiment of the present specification.

FIG. 13 is a diagram illustrating another example of a mobile device according to one embodiment of the present specification. In more detail, FIG. 13 illustrates contents displayed on the e-paper display unit 110 if the mobile device is switched to the standby mode while the user 300 is using the additional display unit 140. FIG. 13(a) illustrates the active mode 60 of the additional display unit 140, the upper end of FIG. 13(b) illustrates the standby mode 40 of the additional display unit 140, and the lower end of FIG. 13(b) illustrates the standby mode 20 of the e-paper display unit 110. Also, the following description will be made on the assumption that the additional display unit 140 is the display unit that uses the liquid crystal display panel.

First of all, referring to FIG. 13(a), in the active mode 60, the mobile device 100 may be located in such a manner that the additional display unit 140 is towards the user 300. In this case, if the mobile device 100 detects a lack of the touch input signal for a predetermined time or if the mobile device 100 detects the touch input signal within the predetermined time, the mobile device 100 may be switched to the standby mode 40 or 20.

In the standby mode 40, as described in FIG. 12, the mobile device 100 may deactivate the additional display unit 140. In the meantime, the mobile device 100 may display the image of the contents displayed on the e-paper display unit 110 when the mobile device 100 may be switched to the standby mode, and may be switched to the standby mode.

As a result, the user may continue to use the contents displayed on the additional display unit 140, on the e-papery display unit 110 during the standby mode.

Figure 14:
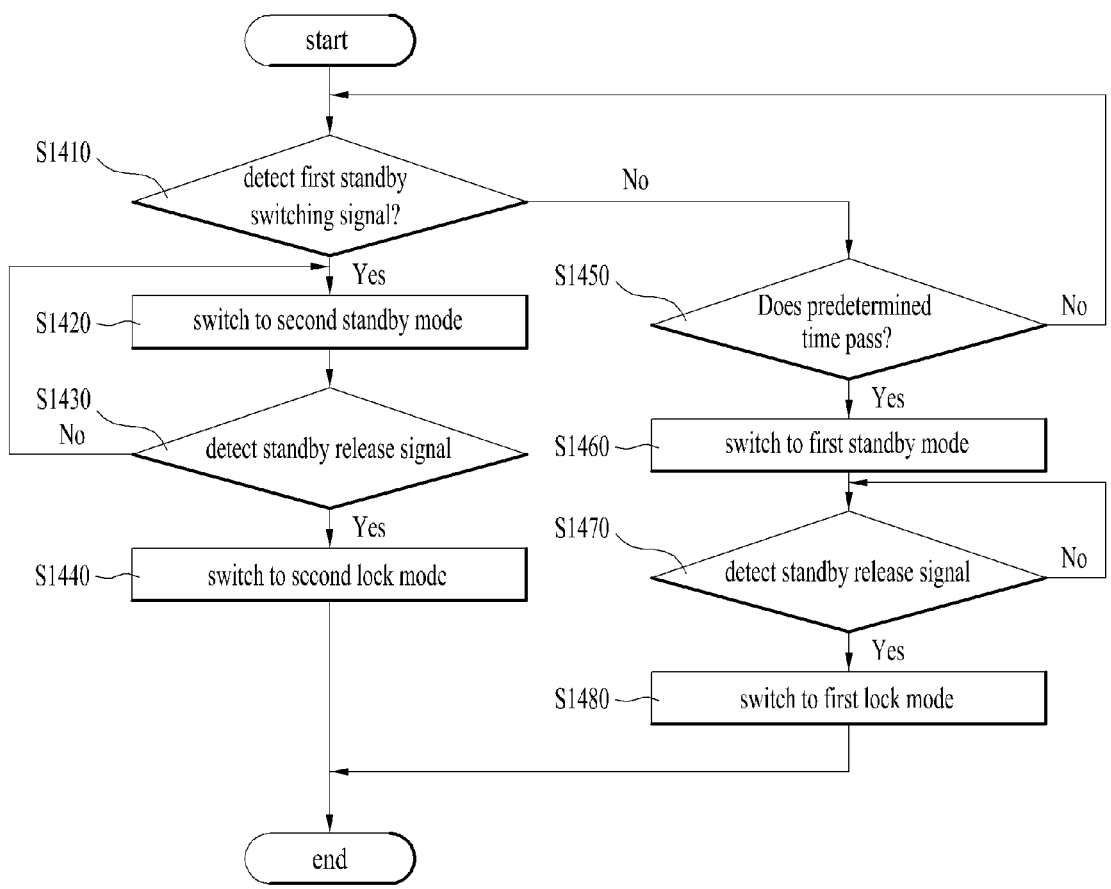
FIG. 14 is a flow chart illustrating a method for controlling a mobile device according to one embodiment of the present specification.

FIG. 14 is a flow chart illustrating a method for controlling a mobile device according to one embodiment of the present specification. Hereinafter, each step of FIG. 14 may be controlled by the processor 130 of the mobile device 100 shown in FIG. 1.

First of all, the mobile device 100 may determine whether to detect the first standby switching signal (S1410). In this case, the first standby switching signal is the signal for switching the active mode to the standby mode, and may correspond to the input signal based on the power button.

At step S1410, if the first standby switching signal is detected, the mobile device may be switched to the second standby mode (S1420). In this case, as described in FIG. 7, the second standby switching mode may represent the mode for displaying a second image on the e-paper display unit and disabling detecting of the touch input signal for the displayed second image. At this time, the second image may correspond to the image obtained by display of predetermined contents. For example, the predetermined contents may include calendar contents, date and time contents, and memo contents.

Next, the mobile device may determine whether to detect the standby release signal (S1430). In this case, as described in FIG. 8, the standby release signal is the signal for releasing the standby mode, and may include an input signal for a home button located at the front of the mobile device or an input signal for a power button located at the side of the mobile device.

At step S1430, if the mobile device detects the standby release signal, the mobile device may be switched to the second lock mode (S1440). In this case, as described in FIG. 6, the second lock mode may represent the mode for displaying the unlock interface on the second image. Also, in the second lock mode, the mobile device may disable detecting of the input signal for the zone except for the unlock interface. In the meantime, at step S1430, if the mobile device detects a lack of the standby release signal, the mobile device 100 may maintain the second standby mode as it is.

Also, at step S1410, if the lack of the first standby switching signal is detected, the mobile device may determine whether a predetermined time passes (S1450). In this case, the predetermined time may be set by the user as described in FIG. 7, and may correspond to 10 seconds, 20 seconds, 30 seconds, etc. At step S1410, if the predetermined time passes, the mobile device may be switched to the first standby mode (S1460). In this case, in the first standby mode, the first image may be displayed on the e-paper display unit, and detecting of the touch input signal for the displayed first image may be disabled. At this time, the first image may correspond to the image displayed on the e-paper display unit when the mobile device is switched to the first standby mode.

Next, the mobile device may determine whether to detect the standby release signal (S1470). At step S1470, if the standby release signal is detected, the mobile device may be switched to the first lock mode (S1480). In this case, the first lock mode may correspond to the mode for displaying the unlock interface on the first image. In the meantime, at step S1470, if a lack of the standby release signal is detected, the mobile device may maintain the first standby mode as it is.

Figure 15:
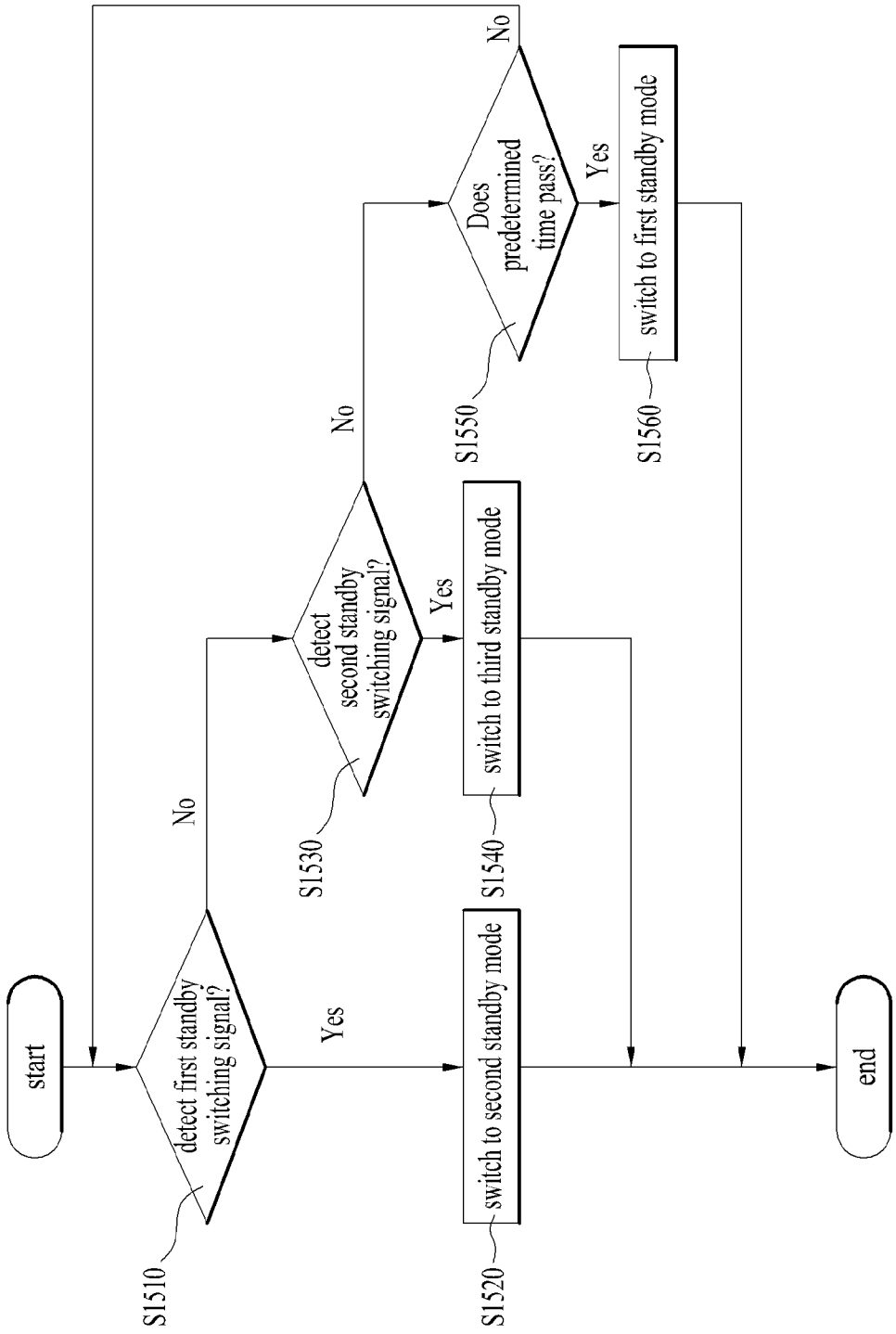
FIG. 15 is a flow chart illustrating another method for controlling a mobile device according to one embodiment of the present specification.

FIG. 15 is a flow chart illustrating another method for controlling a mobile device according to one embodiment of the present specification. Hereinafter, each step of FIG. 15 may be controlled by the processor 130 of the mobile device 100 shown in FIG. 1. Also, in the embodiment of FIG. 15, detailed description of portions the same as or corresponding to those of the embodiment in FIG. 14 will be omitted.

First of all, the mobile device 100 may determine whether to detect the first standby switching signal (S1510). At step S1510, if the first standby switching signal is detected, the mobile device may be switched to the second standby mode (S1520). In the meantime, at step S1510, if a lack of the first standby switching signal is detected, the mobile device may determine whether to detect the second standby switching signal (S1530). In this case, as described in FIG. 7, the second standby switching signal is the signal for switching from the active mode to the standby mode, and may correspond to the signal different from the first standby switching signal. For example, the second standby switching signal may include a multi-input and a long input for the power button.

At step S1530, if the second standby switching signal is detected, the mobile device may be switched to the third standby mode (S1540). In this case, as described in FIG. 7, the third standby mode may represent the mode for displaying a blank image on the e-paper display unit and disabling detecting of the touch input signal for the blank image. In the meantime, at step S1530, if the lack of the second standby switching signal is detected, the mobile device may determine whether a predetermined time passes (S1550). At step S1550, if the predetermined time passes, the mobile device may be switched to the first standby mode (S1560).

FIG. 16 is a flow chart illustrating other method for controlling a mobile device according to one embodiment of the present specification. Hereinafter, each step of FIG. 16 may be controlled by the processor 130 of the mobile device 100 shown in FIG. 1. Also, in the embodiment of FIG. 16, detailed description of portions the same as or corresponding to those of the embodiment in FIG. 14 will be omitted.

Figure 16A:
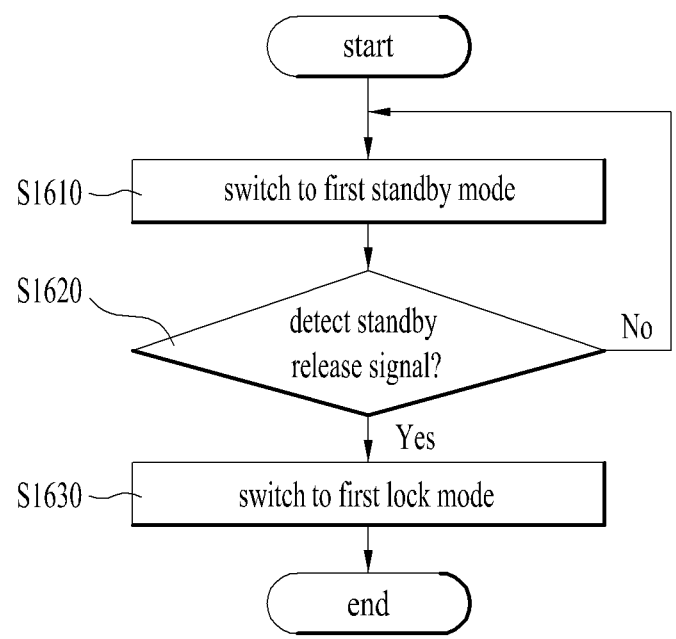
FIGS. 16A and 16B are flow charts illustrating other method for controlling a mobile device according to one embodiment of the present specification.

First of all, referring to FIG. 16A, the mobile device 100 may be switched to the first standby mode as shown in FIG. 14 (S1610). Next, the mobile device 100 may determine whether to detect the standby release signal (S1620). At step S1620, if the standby release signal is detected, the mobile device may be switched to the first lock mode (S1630). In the meantime, at step S1620, if a lack of the standby release signal is detected, the mobile device may maintain the first standby mode as it is.

Figure 16B:
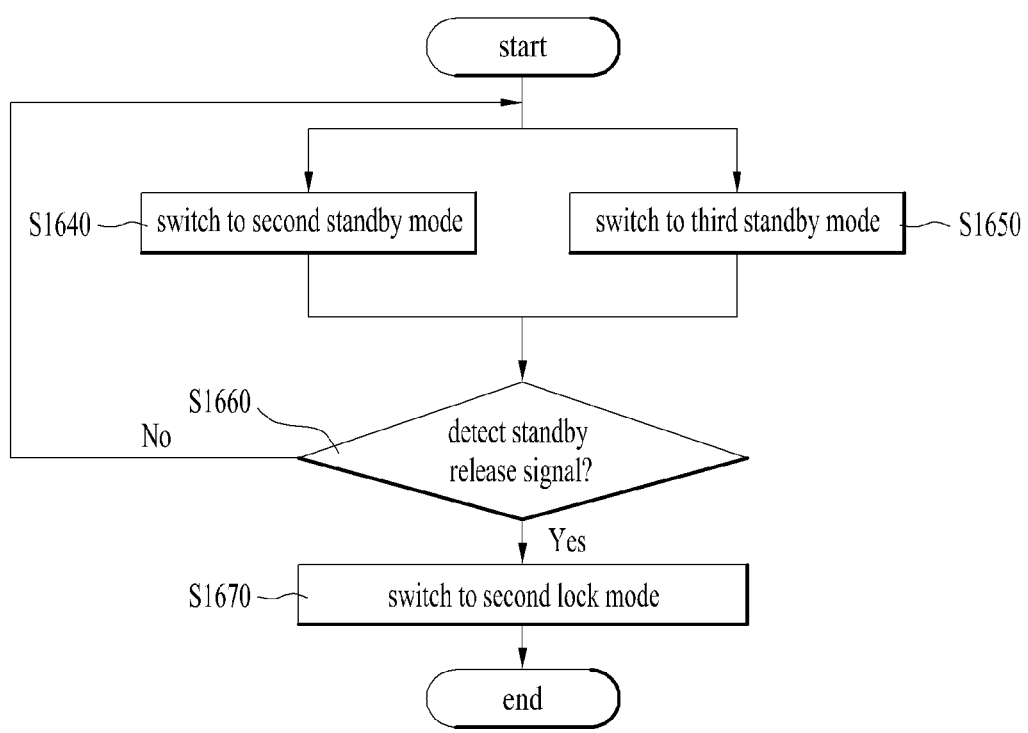

In the meantime, referring to FIG. 16B, as shown in FIG. 15, the mobile device 100 may be switched to the second standby mode (S1640) or the third standby mode (S1650). Next, the mobile device 100 may determine whether to detect the standby release signal (S1660). At step S1660, if the standby release signal is detected, the mobile device may be switched to the second lock mode (S1670). In the meantime, at step S1660, if the lack of the standby release signal is detected, the mobile device may maintain the second standby mode or the third standby mode as it is.

Moreover, although the description may be made for each of the drawings, the embodiments of the respective drawings may be incorporated to achieve a new embodiment. A computer readable recording medium where a program for implementing the embodiments is recorded may be designed in accordance with the need of the person skilled in the art within the scope of the present specification.

The mobile device, which uses the e-paper display panel, and the method for controlling the same according to the present specification are not limited to the aforementioned embodiments, and all or some of the aforementioned embodiments may selectively be configured in combination so that various modifications may be made in the aforementioned embodiments.

In the meantime, the mobile device, which uses the e-paper display panel, and the method for controlling the same according to the present specification may be implemented in a recording medium, which can be read by a processor provided in a network device, as a code that can be read by the processor. The recording medium that can be read by the processor includes all kinds of recording media in which data that can be read by the processor are stored. Examples of the recording medium include a ROM, a RAM, a CD-ROM, a magnetic tape, a floppy disk, and an optical data memory. Also, another example of the recording medium may be implemented in a type of carrier wave such as transmission through Internet. Also, the recording medium that can be read by the processor may be distributed in a computer system connected thereto through the network, whereby codes that can be read by the processor may be stored and implemented in a distributive mode.

It will be apparent to those skilled in the art that the present specification can be embodied in other specific forms without departing from the spirit and essential characteristics of the specification. Thus, the above embodiments are to be considered in all respects as illustrative and not restrictive. The scope of the invention should be determined by reasonable interpretation of the appended claims and all change which comes within the equivalent scope of the invention are included in the scope of the invention.

In this specification, both the product invention and the method invention have been described, and description of both inventions may be made complementally if necessary.

What is claimed is:

1. A mobile device comprising:
an e-paper display unit configured to display contents;
an input signal receiving unit configured to detect an input signal and transmit the detected input signal to a processor; and
the processor configured to control the e-paper display unit and the input signal receiving unit,
wherein the processor is further configured to:
switch the mobile device from an active mode to a first standby mode when a lack of a touch input signal is detected for a predetermined time, wherein the first standby mode is a mode displaying a first image on the e-paper display unit and disabling detecting of a touch input signal for the displayed first image,
switch the mobile device from an active mode to a second standby mode when a first standby switching signal is detected within the predetermined time, wherein the second standby mode is a mode displaying a second image on the e-paper display unit and disabling detecting of a touch input signal for the displayed second image,
switch the mobile device to a first lock mode when a standby release signal is detected in the first standby mode, wherein the first lock mode is a mode displaying an unlock interface on the first image,
switch the mobile device to a second lock mode when the standby release signal is detected in the second standby mode, wherein the second lock mode is a mode displaying the unlock interface on the second image, and
switch the mobile device to an active mode when an unlock signal is detected in the first lock mode or the second lock mode.

2. The mobile device according to claim 1, wherein the first image is the image displayed on the e-paper display unit just before the mobile device is switched to the first standby mode, and the second image is the image displaying a predetermined contents.

3. The mobile device according to claim 1, wherein the processor is further configured to switch the mobile device to a third standby when a second standby switching signal is detected within the predetermined time, wherein the third standby mode is a mode displaying a blank image on the e-paper display unit and disabling detecting of a touch input signal for the blank image.

4. The mobile device according to claim 3, wherein the processor is further configured to:
switch the mobile device to the second lock mode when the standby release signal is detected in the third standby mode.

5. The mobile device according to claim 4, wherein at least one of the first standby switching signal, the second standby switching signal and the standby release signal is the input signal for a physical button arranged in the mobile device.

6. The mobile device according to claim 4, wherein the unlock interface includes at least one of a sliding interface, a pattern recognition interface, a face recognition interface, a number recognition interface, and a fingerprint recognition interface.

7. The mobile device according to claim 4, wherein the processor is further configured to disable detecting of a touch input signal for a region except for the unlock interface of the e-paper display unit in the first and second lock modes.

8. The mobile device according to claim 3, wherein the processor is further configured to display a touch off indicator indicating that a touch input is limited on the e-paper display unit when the mobile device is switched to the first to third standby modes.

9. The mobile device according to claim 3, further comprising an additional display unit,
wherein the processor is further configured to:
switch the mobile device to one of the first to third standby modes, wherein the e-paper display unit is located towards a user when the mobile device is switched to one of the first to third standby modes, and
switch the mobile device to one of the first to second lock modes when the standby release signal is detected, wherein the additional display unit is located towards the user when the standby release signal is detected, and wherein an image displayed on the additional display unit in the first or second lock mode is determined on the basis of the image displayed on the e-paper display unit in the first to third standby modes.

10. The mobile device according to claim 9, wherein the processor is further configured to display the first image and the unlock interface on the additional display unit in the first lock mode, and display the second image and the unlock interface on the additional display unit in the second lock mode.

11. The mobile device according to claim 9, wherein the processor is further configured to deactivate the additional display unit when the mobile device is switched to the first to third standby modes.

12. The mobile device according to claim 9, wherein the processor is further configured to display the same image displayed in the first to third standby modes, on the e-paper display unit when the mobile device is switched to the first to second lock modes.

13. The mobile device according to claim 1, wherein the processor is further configured to display contents corresponding to the first image on the e-paper display unit when the unlock signal is detected in the first lock mode.

14. The mobile device according to claim 1, wherein the processor is further configured to display contents displayed before the mobile device is switched to a home screen or the second or the third standby mode when the unlock signal is detected in the second lock mode.

15. The mobile device according to claim 1, wherein the unlock signal is a touch input signal for the unlock interface.

16. The mobile device according to claim 1, wherein the processor is further configured to deactivate detecting of the touch input signal in the active mode.

17. A method for controlling a mobile device including an e-paper display unit, the method comprising:
switching the mobile device from an active mode to a first standby mode when a lack of a touch input signal is detected for a predetermined time, wherein the first standby mode is a mode displaying a first image on the e-paper display unit and disabling detecting of a touch input signal for the displayed first image;
switching the mobile device from an active mode to a second standby mode when a first standby switching signal is detected within the predetermined time, wherein the second standby mode is a mode displaying a second image on the e-paper display unit and disabling detecting of a touch input signal for the displayed second image;
switching the mobile device to a first lock mode when a standby release signal is detected in the first standby mode, wherein the first lock mode is a mode displaying an unlock interface on the first image; and
switching the mobile device to a second lock mode when the standby release signal is detected in the second standby mode, where in the second lock mode is a mode displaying the unlock interface on the second image.

18. The method according to claim 17, further comprising:
switching the mobile device to a third standby mode when a second standby switching signal is detected within the predetermined time, wherein the third standby mode is a mode displaying a blank image on e-paper display unit and disabling detecting a touch input signal for the blank image.

* * * * *